United States Patent
Homma et al.

(10) Patent No.: US 12,228,638 B2
(45) Date of Patent: Feb. 18, 2025

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Takuya Homma, Yokohama (JP);
Tooru Sahara, Yokohama (JP);
Masayuki Sato, Yokohama (JP);
Masamitsu Nishikido, Yokohama (JP);
Youhei Murakami, Yokohama (JP);
Satoshi Kawaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 322 days.

(21) Appl. No.: 17/756,739

(22) PCT Filed: Dec. 1, 2020

(86) PCT No.: PCT/JP2020/044745
§ 371 (c)(1),
(2) Date: Jun. 1, 2022

(87) PCT Pub. No.: WO2021/117559
PCT Pub. Date: Jun. 17, 2021

(65) Prior Publication Data
US 2023/0003876 A1    Jan. 5, 2023

(30) Foreign Application Priority Data
Dec. 9, 2019   (JP) .................. 2019-222346

(51) Int. Cl.
*G01S 13/93*     (2020.01)
*G01S 13/58*     (2006.01)
*G01S 13/931*    (2020.01)

(52) U.S. Cl.
CPC ............ *G01S 13/931* (2013.01); *G01S 13/58* (2013.01)

(58) Field of Classification Search
CPC ................. G01S 13/931; G01S 13/58
(Continued)

(56) References Cited

U.S. PATENT DOCUMENTS 9,599,702 B1 * 3/2017 Bordes ............... G01S 13/18
2019/0137606 A1 * 5/2019 Buddendick ......... G01S 13/931
(Continued)

FOREIGN PATENT DOCUMENTS

CN  104613963 B  * 10/2017  ............ G01C 21/08
DE  102016215102 A1 * 12/2017  ............ G01S 7/41
(Continued)

OTHER PUBLICATIONS

Daisuke Kamisaka et al., "Proposal of dead reckoning method for pedestrians using a sensor held in the hand", Information Processing Society of Japan, Feb. 2011, vol. 52, No. 2, pp. 558-570.
(Continued)

*Primary Examiner* — James R Hulka
*Assistant Examiner* — Samarina Makhdoom
(74) *Attorney, Agent, or Firm* — Studebaker & Brackett PC

(57) ABSTRACT

An electronic device includes a transmission antenna that transmits a transmission wave, a reception antenna that receives a reflected wave that is the transmission wave having been reflected, and a control unit that detects an object that reflects the transmission wave, based on a transmission signal transmitted as the transmission wave and a reception signal received as the reflected wave. The control unit performs control to detect, as a target, an object having a motion characteristic of a motion of an arm of a person, among objects located around the electronic device.

10 Claims, 13 Drawing Sheets

(58) Field of Classification Search
USPC .......................................................... 342/175
See application file for complete search history.

(56) References Cited

U.S. PATENT DOCUMENTS

| | | | |
|---|---|---|---|
| 2019/0318162 A1* | 10/2019 | Yan | G01S 13/931 |
| 2019/0347938 A1* | 11/2019 | Chase | H04N 23/23 |

FOREIGN PATENT DOCUMENTS

| | | | |
|---|---|---|---|
| JP | 2004-325113 A | 11/2004 | |
| JP | 2018-112467 A | 7/2018 | |
| WO | 2021/117559 A1 | 6/2021 | |

OTHER PUBLICATIONS

Belgiovane Domenic et al., "Micro-Doppler Characteristics of Pedestrians and Bicycles for Automotive Radar Sensors at 77 GHz", 2017 11th European Conference on Antennas and Propagation (EUCAP), Paris, France, Mar. 19, 2017, pp. 2912-2916, IEEE.

Otero M., "Application of a continuous wave radar for human gait recognition", Proceedings of the SPIE, vol. 5809, Signal Processing, Sensor Fusion, and Target Recognition XIV, May 25, 2005, pp. 538-548.

\* cited by examiner

FIG. 5
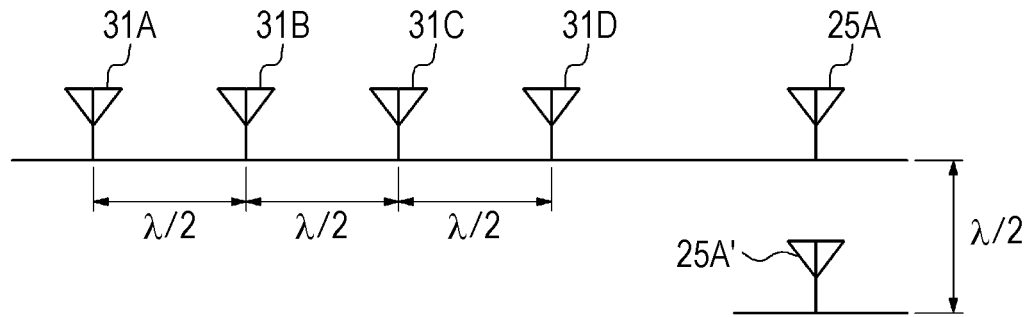
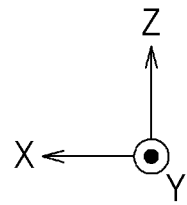
FIG. 6
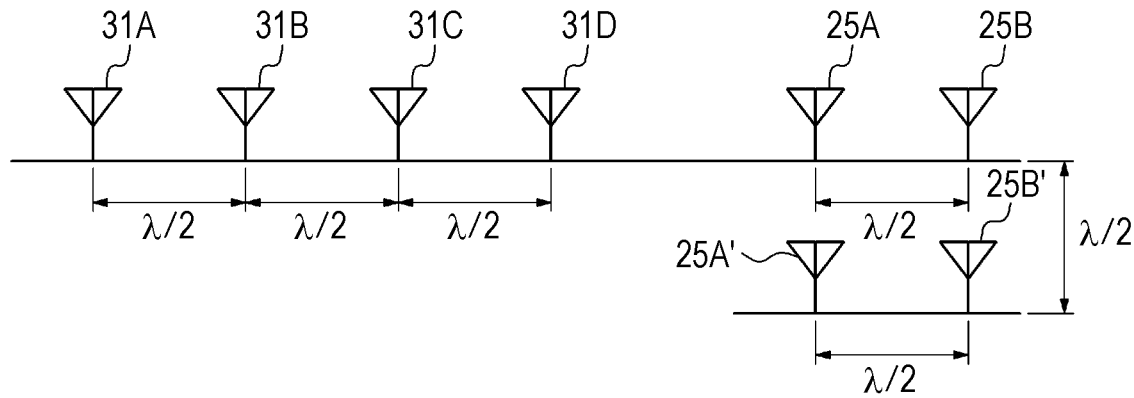
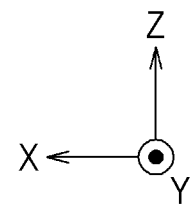

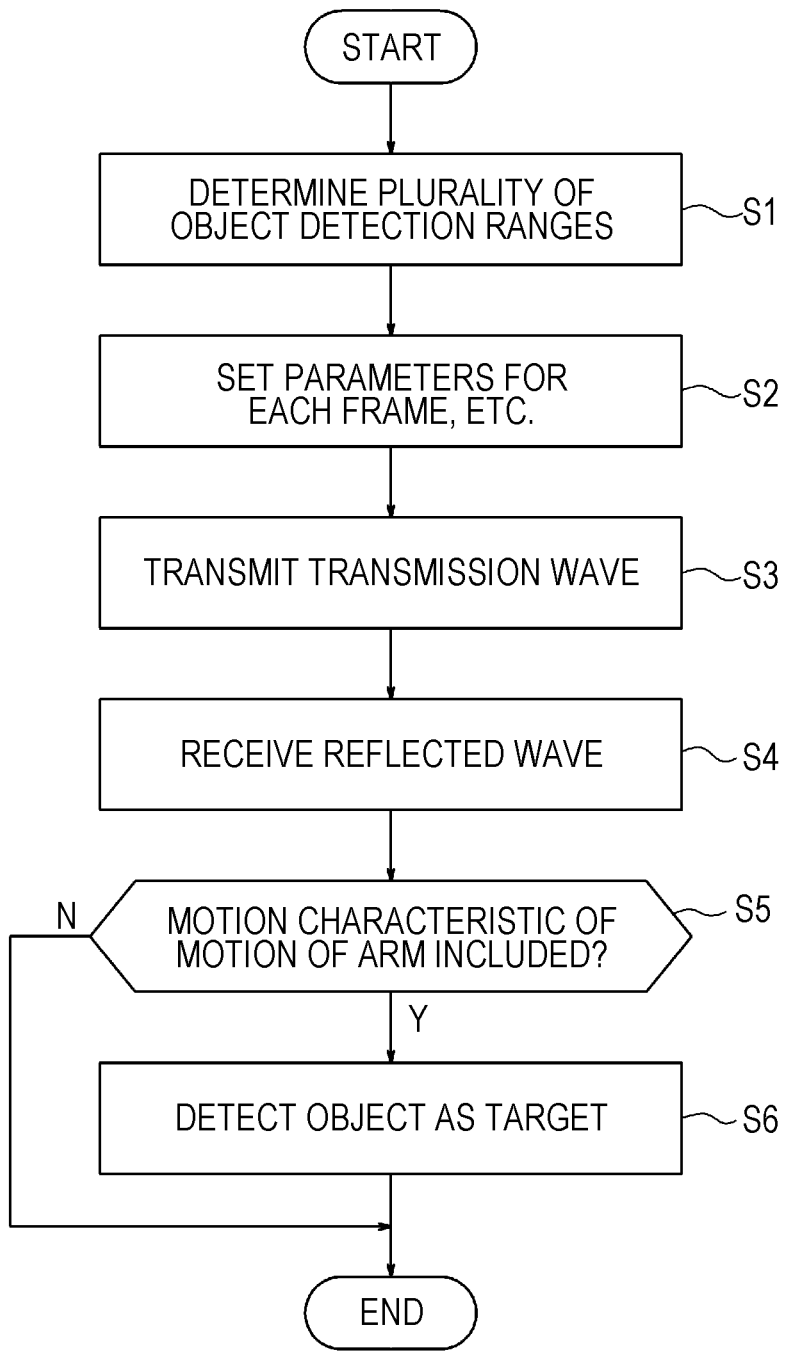

ELECTRONIC DEVICE, METHOD FOR CONTROLLING ELECTRONIC DEVICE, AND PROGRAM

CROSS-REFERENCE TO RELATED APPLICATIONS

This application claims priority from Japanese Patent Application No. 2019-222346 filed in Japan on Dec. 9, 2019, the entire disclosure of which is incorporated herein by reference.

TECHNICAL FIELD

The present disclosure relates to an electronic device, a method for controlling an electronic device, and a program.

BACKGROUND ART

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and by receiving a reflected wave reflected off the object. Such a technology for measuring a distance or the like expectedly becomes more important in the future with progresses of a technology for assisting drivers in driving and an automated-driving-related technology for partially or entirely automating driving.

Various suggestions have been made in relation to a technology for detecting the presence of a predetermined object by receiving a reflected wave of a radio wave that has been transmitted and reflected off the object. For example, PTL 1 discloses a radar device capable of determining whether a detected object is a pedestrian on the basis of a location and a moving velocity of the object.

CITATION LIST

Patent Literature

PTL 1: Japanese Unexamined Patent Application Publication No. 2018-112467

SUMMARY OF INVENTION

In one embodiment, an electronic device includes a transmission antenna that transmits a transmission wave, a reception antenna that receives a reflected wave that is the transmission wave having been reflected, and a control unit.

The control unit detects an object that reflects the transmission wave, based on a transmission signal transmitted as the transmission wave and a reception signal received as the reflected wave.

The control unit performs control to detect, as a target, an object having a motion characteristic of a motion of an arm of a person, among objects located around the electronic device.

In one embodiment, a method for controlling an electronic device includes
 a step of transmitting a transmission wave from a transmission antenna,
 a step of receiving, from a reception antenna, a reflected wave that is the transmission wave having been reflected, and
 a step of detecting an object that reflects the transmission wave, based on a transmission signal transmitted as the transmission wave and a reception signal received as the reflected wave.

In the step of detecting, among objects located around the electronic device, an object having a motion characteristic of a motion of an arm of a person is detected as a target.

In one embodiment, a program causing an electronic device to execute
 a step of transmitting a transmission wave from a transmission antenna,
 a step of receiving, from a reception antenna, a reflected wave that is the transmission wave having been reflected, and
 a step of detecting an object that reflects the transmission wave, based on a transmission signal transmitted as the transmission wave and a reception signal received as the reflected wave.

In the step of detecting, among objects located around the electronic device, an object having a motion characteristic of a motion of an arm of a person is detected as a target.

BRIEF DESCRIPTION OF DRAWINGS

FIG. 5 is illustrating an example of arrangement of transmission antennas and reception antennas of the electronic device according to the one embodiment.

FIG. 6 is a diagram illustrating another example of the arrangement of the transmission antennas and the reception antennas of the electronic device according to the one embodiment.

FIG. 14 is a flowchart for describing an operation of the electronic device according to the one embodiment.

DESCRIPTION OF EMBODIMENTS

Figure 1:
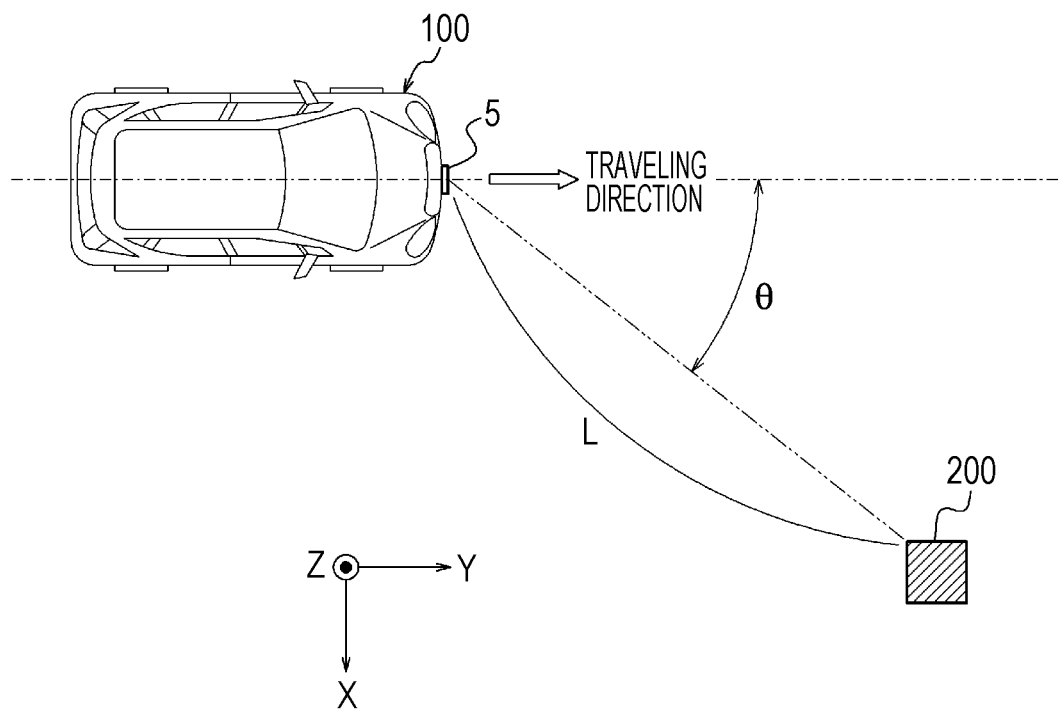
FIG. 1 is a diagram for describing how an electronic device according to one embodiment is used.

In a technology for detecting a predetermined object by receiving a reflected wave that is a transmitted transmission wave reflected off the object, it is beneficial if a walking or running person can be detected as a target as in the radar described above. That is, in the above-described technology for detecting an object, it is beneficial if a walking or running person, rather than a moving non-living thing or animal, can be detected. An object of the present disclosure is to provide an electronic device, a method for controlling an electronic device, and a program that can detect a walking or running person as a target. According to one embodiment, an electronic device, a method for controlling an electronic device, and a program that can detect a walking or running person as a target can be provided. One embodiment is described in detail below with reference to the drawings.

An electronic device according to one embodiment is mounted in a vehicle (mobility device) such as an automobile, for example, and thus is capable of detecting, as a target, a predetermined object located around the mobility device. Therefore, the electronic device according to the one embodiment is capable of transmitting a transmission wave to an area around the mobility device from a transmission antenna installed on the mobility device. The electronic device according to the one embodiment is also capable of receiving a reflected wave that is the reflected transmission wave, from a reception antenna installed on the mobility device. At least one of the transmission antenna and the reception antenna may be included in a radar sensor or the like installed on the mobility device, for example.

A configuration in which the electronic device according to the one embodiment is mounted in an automobile such as a passenger car is described below as a typical example. However, the mobility device in which the electronic device according to the one embodiment is mounted is not limited to an automobile. The electronic device according to the one embodiment may be mounted in various mobility devices such as an autonomous car, a bus, a truck, a motorcycle, a bicycle, a ship, an aircraft, an agricultural machine such as a tractor, a snowplow, a garbage truck, a police car, an ambulance, a fire engine, a helicopter, and a drone. The mobility device in which the electronic device according to the one embodiment is mounted is not necessarily limited also to a mobility device that moves by its own motive power. For example, the mobility device in which the electronic device according to the one embodiment is mounted may be a trailer towed by a tractor. The electronic device according to the one embodiment is capable of measuring a distance or the like between the sensor and a predetermined object when at least one of the sensor and the object is movable. The electronic device according to the one embodiment is also capable of measuring the distance or the like between the sensor and the object even when both the sensor and the object are stationary.

An example of how the electronic device according to the one embodiment detects an object is described first.

FIG. 1 is a diagram for describing how the electronic device according to the one embodiment is used. FIG. 1 illustrates an example in which a sensor including a transmission antenna and a reception antenna according to the one embodiment is installed on a mobility device.

A sensor 5 including a transmission antenna and a reception antenna according to the one embodiment is installed on a mobility device 100 illustrated in FIG. 1. It is assumed that an electronic device 1 according to the one embodiment is also mounted (for example, built) in the mobility device 100 illustrated in FIG. 1. A specific configuration of the electronic device 1 is described later. The sensor 5 may include at least one of the transmission antenna and the reception antenna, for example. The sensor 5 may also appropriately include at least any of other functional units, such as at least part of a control unit 10 (FIG. 2) included in the electronic device 1. The mobility device 100 illustrated in FIG. 1 may be an automotive vehicle such as a passenger car but may be a mobility device of any type. In FIG. 1, the mobility device 100 may move (travel or slowly travel), for example, in a positive Y-axis direction (traveling direction) illustrated in FIG. 1 or in another direction, or may be stationary without moving.

As illustrated in FIG. 1, the sensor 5 including the transmission antenna is installed on the mobility device 100. In the example illustrated in FIG. 1, only one sensor 5 including the transmission antenna and the reception antenna is installed at a front portion of the mobility device 100. The position where the sensor 5 is installed on the mobility device 100 is not limited to the position illustrated in FIG. 1 and may be another appropriate position. For example, the sensor 5 illustrated in FIG. 1 may be installed on a left side, on a right side, and/or at a rear portion of the mobility device 100. The number of such sensors 5 may be any number equal to or greater than 1 depending on various conditions (or requirements) such as a range and/or an accuracy of measurement performed at the mobility device 100. The sensor 5 may be installed inside the mobility device 100. The inside the mobility device 100 may be, for example, a space inside a bumper, a space inside a body, a space inside a headlight, or a space such as a driver's space.

The sensor 5 transmits an electromagnetic wave as a transmission wave from the transmission antenna. For example, when a predetermined object (for example, an object 200 illustrated in FIG. 1) is located around the mobility device 100, at least part of the transmission wave transmitted from the sensor 5 is reflected off the object to become a reflected wave. For example, the reception antenna of the sensor 5 receives such a reflected wave. In this manner, the electronic device 1 mounted in the mobility device 100 can detect the object as the target.

The sensor 5 including the transmission antenna may be typically a radar (Radio Detecting and Ranging) sensor that transmits and receives a radio wave. However, the sensor 5 is not limited to a radar sensor. The sensor 5 according to the one embodiment may be, for example, a sensor based on the LIDAR (Light Detection and Ranging, Laser Imaging Detection and Ranging) technology that uses an optical wave. Each of these sensors can include, for example, a patch antenna. Since the technologies such as RADAR and LIDAR are already known, detailed description may be appropriately simplified or omitted.

The electronic device 1 mounted in the mobility device 100 illustrated in FIG. 1 receives, from the reception antenna, the reflected wave of the transmission wave transmitted from the transmission antenna of the sensor 5. In this manner, the electronic device 1 can detect, as the target, the predetermined object 200 located within a predetermined distance from the mobility device 100. For example, as illustrated in FIG. 1, the electronic device 1 can measure a distance L between the mobility device 100, which is a vehicle of interest, and the predetermined object 200. The electronic device 1 can also measure a relative velocity between the mobility device 100, which is the vehicle of interest, and the predetermined object 200. The electronic device 1 can further measure a direction (an angle of arrival 9) from which the reflected wave from the predetermined object 200 arrives at the mobility device 100, which is the vehicle of interest.

The object 200 may be, for example, at least any of an oncoming automobile traveling in a lane adjacent to a lane of the mobility device 100, an automobile traveling side by side with the mobility device 100, an automobile traveling in front of or behind the mobility device 100 in the same lane, and the like. The object 200 may also be any object located around the mobility device 100, such as a motorcycle, a bicycle, a stroller, a person such as a pedestrian, other forms of life such as an animal or an insect, a guardrail, a median strip, a road sign, a step on a sidewalk, a wall, a manhole, a structure such as a house, a building, or a bridge, or an obstacle. The object 200 may be in motion or stationary. For example, the object 200 may be an automobile or the like that is parked or stationary around the mobility device 100. In addition, the object 200 may be located not only on a road but also at an appropriate place such as on a sidewalk, in a farm, on a farmland, in a parking lot, in a vacant lot, a space on a road, in a store, at a crossing, on the water, in the air, in a gutter, in a river, in another mobility device, in a building, inside or outside of other structures. In the present disclosure, the object detected by the sensor 5 includes living things such as a person, a dog, a cat, a horse, and other animals in addition to non-living things. The object detected by the sensor 5 in the present disclosure includes a target, which includes a person, an object, and an animal, to be detected with the radar technology.

In FIG. 1, a ratio between a size of the sensor 5 and a size of the mobility device 100 does not necessarily indicate an actual ratio. FIG. 1 illustrates the sensor 5 that is installed on an outer portion of the mobility device 100. However, in one embodiment, the sensor 5 may be installed at various positions of the mobility device 100. For example, in one embodiment, the sensor 5 may be installed inside a bumper of the mobility device 100 so as not to be seen in the appearance of the mobility device 100. In addition, the position where the sensor 5 is installed in the mobility device 100 may be either outside or inside of the mobility device 100. The inside of the mobility device 100 may refer to, for example, inside of the body of the mobility device 100, inside of the bumper, inside of a headlight, a space in the mobility device 100, or any combination of these.

Description is given below on the assumption that the transmission antenna of the sensor 5 transmits a radio wave in a frequency band, such as a millimeter wave (equal to or higher than 30 GHz) or a quasi-millimeter wave (for example, around 20 GHz to 30 GHz) as a typical example. For example, the transmission antenna of the sensor 5 may transmit a radio wave having a frequency bandwidth of 4 GHz such as from 77 GHz to 81 GHz.

Figure 2:
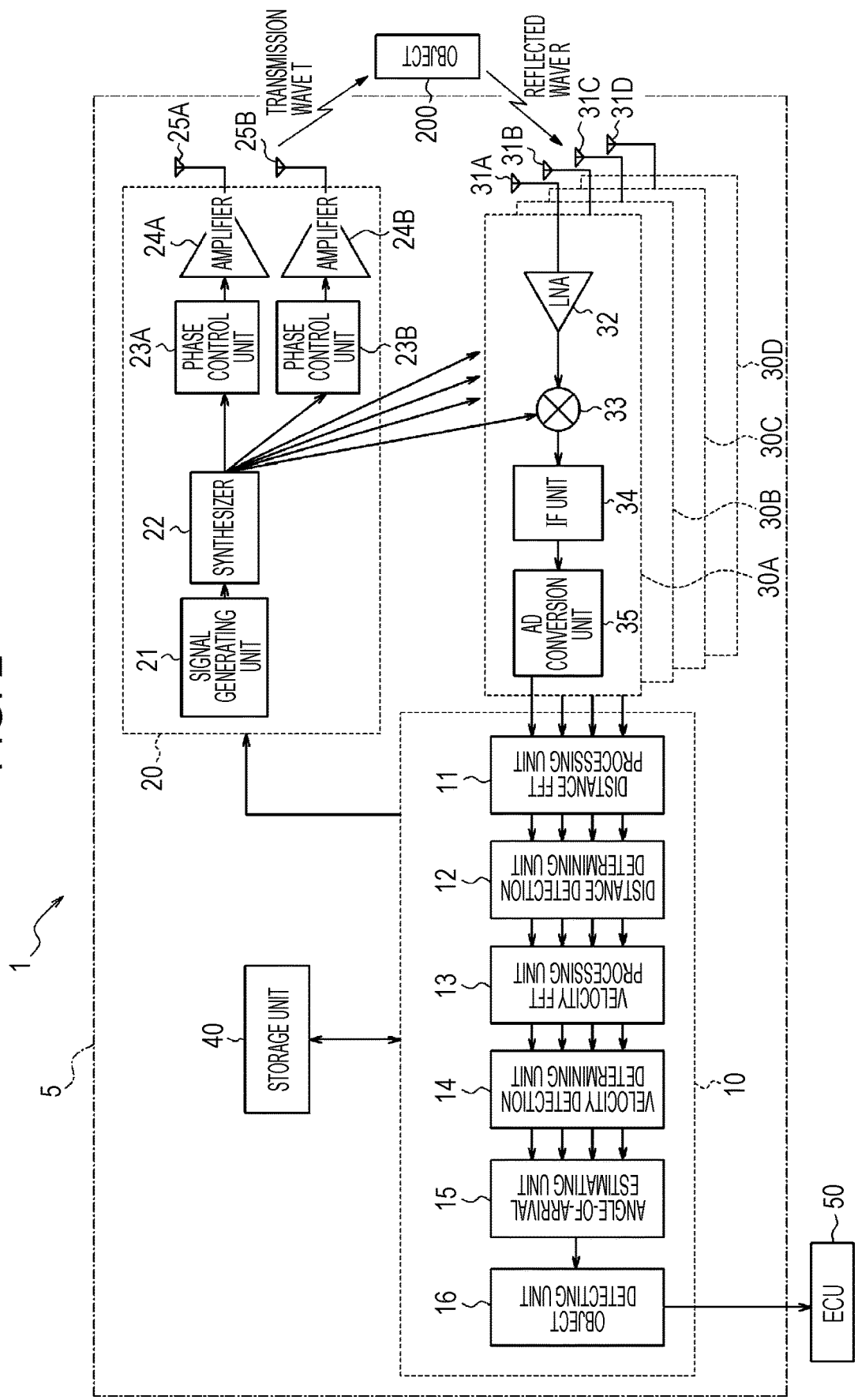
FIG. 2 is a functional block diagram schematically illustrating a configuration of the electronic device according to the one embodiment.

FIG. 2 is a functional block diagram schematically illustrating an example of a configuration of the electronic device 1 according to the one embodiment. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency bandwidth of 79 GHz has a characteristic that the usable frequency bandwidth is wider than that of another millimeter-wave and/or quasi-millimeter-wave radar of a frequency band of 24 GHz, 60 GHz, or 76 GHz, for example. Such an embodiment is described below as an example. The FMCW radar scheme used in the present disclosure may include an FCM scheme (Fast-Chirp Modulation) for transmitting chirp signals at a shorter period than usual. A signal generated by a signal generating unit 21 is not limited to a signal of the FM-CW scheme. The signal generated by the signal generating unit 21 may be a signal of various schemes other than the FM-CW scheme. A transmission signal sequence stored in a storage unit 40 may change in accordance with these various schemes. For example, in the case of a radar signal of the FM-CW scheme described above, a signal whose frequency increases for each time sample and a signal whose frequency decreases for each time sample may be used. More detailed description of the various schemes described above is omitted because known techniques can be appropriately employed.

As illustrated in FIG. 2, the electronic device 1 according to the one embodiment is constituted by the sensor 5 and an ECU (Electronic Control Unit) 50. The ECU 50 controls various operations of the mobility device 100. The ECU 50 may be constituted by at least one or more ECUs. The electronic device 1 according to the one embodiment includes the control unit 10. The electronic device 1 according to the one embodiment may also appropriately include another functional unit such as at least any of a transmission unit 20, reception units 30A to 30D, and the storage unit 40. As illustrated in FIG. 2, the electronic device 1 may include a plurality of reception units such as the reception units 30A to 30D. When the reception units 30A, 30B, 30C, and 30D are not distinguished from one another, the reception units 30A, 30B, 30C, and 30D are simply referred to as "reception units 30" below.

The control unit 10 may include a distance FFT processing unit 11, a distance detection determining unit 12, a velocity FFT processing unit 13, a velocity detection determining unit 14, an angle-of-arrival estimating unit 15, and an object detecting unit 16. These functional units included in the control unit 10 are further described later.

As illustrated in FIG. 2, the transmission unit 20 may include the signal generating unit 21, a synthesizer 22, phase control units 23A and 23B, amplifiers 24A and 24B, and transmission antennas 25A and 25B. When the phase control units 23A and 23B are not distinguished from each other, the phase control units 23A and 23B are simply referred to as "phase control units 23" below. When the amplifiers 24A and 24B are not distinguished from each other, the amplifiers 24A and 24B are simply referred to as "amplifiers 24" below. When the transmission antennas 25A and 25B are not distinguished from each other, the transmission antennas 25A and 25B are simply referred to as "transmission antennas 25" below.

As illustrated in FIG. 2, each of the reception units 30 may include a respective one of reception antennas 31A to 31D. When the reception antennas 31A, 31B, 31C, and 31D are not distinguished from one another, the reception antennas 31A, 31B, 31C, and 31D are simply referred to as "reception antennas 31" below. As illustrated in FIG. 2, each of the plurality of reception units 30 may include an LNA 32, a mixer 33, an IF unit 34, and an AD conversion unit 35. The reception units 30A to 30D may have the same and/or similar configuration. FIG. 2 schematically illustrates the configuration of only the reception unit 30A as a representative example.

The sensor 5 described above may include, for example, the transmission antennas 25 and the reception antennas 31. The sensor 5 may also appropriately include at least any of other functional units such as the control unit 10.

The control unit 10 included in the electronic device 1 according to the one embodiment is capable of controlling the individual functional units of the electronic device 1 and also controlling operations of the entire electronic device 1. To provide control and processing capabilities for executing various functions, the control unit 10 may include at least one processor, for example, a CPU (Central Processing Unit). The control unit 10 may be collectively implemented by one processor, may be implemented by some processors, or may be implemented by discrete individual processors. The processor may be implemented as one integrated circuit. The integrated circuit is also referred to as an IC. The processor may be implemented as a plurality of integrated circuits and discrete circuits connected to be able to perform communication. The processor may be implemented on the basis of various other known technologies. In the one embodiment, the control unit 10 may be configured as, for example, a CPU and a program executed by the CPU. The control unit 10 may appropriately include a memory required for operations of the control unit 10.

The storage unit 40 may store a program executed by the control unit 10, results of processing performed by the control unit 10, etc. The storage unit 40 may function as a work memory of the control unit 10. The storage unit 40 may be constituted by, for example, a semiconductor memory or a magnetic disk. However, the storage unit 40 is not limited to these, and can be any storage device. The storage unit 40 may be, for example, a storage medium such as a memory card inserted to the electronic device 1 according to the present embodiment. The storage unit 40 may be an internal memory of the CPU used as the control unit 10 as described above.

In the one embodiment, the storage unit 40 may store various parameters for setting a range in which an object is detected on the basis of a transmission wave T transmitted from each transmission antenna 25 and a reflected wave R received from each reception antenna 31.

In the electronic device 1 according to the one embodiment, the control unit 10 is capable of controlling at least one of the transmission unit 20 and the reception units 30. In this case, the control unit 10 may control at least one of the transmission unit 20 and the reception units 30, on the basis of various kinds of information stored in the storage unit 40. In the electronic device 1 according to the one embodiment, the control unit 10 may instruct the signal generating unit 21 to generate a signal or may control the signal generating unit 21 to generate a signal.

In accordance with control performed by the control unit 10, the signal generating unit 21 generates a signal (transmission signal) to be transmitted as the transmission wave T from each of the transmission antennas 25. When generating the transmission signal, the signal generating unit 21 may allocate a frequency of the transmission signal in accordance with control performed by the control unit 10, for example. Specifically, the signal generating unit 21 may allocate a frequency of the transmission signal in accordance with a parameter set by the control unit 10, for example. For example, the signal generating unit 21 receives frequency information from the control unit 10 or the storage unit 40 and generates a signal having a predetermined frequency in a frequency band such as from 77 GHz to 81 GHz, for example. The signal generating unit 21 may include a functional unit serving as a voltage control oscillator (VCO), for example.

The signal generating unit 21 may be configured as hardware having the function, as for example a microcomputer, or as for example a processor such as a CPU and a program or the like executed by the processor. Each functional unit described below may also be configured as hardware having the function, as for example a microcomputer if possible, or as for example a processor such as a CPU and a program or the like executed by the processor.

In the electronic device 1 according to the one embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. The signal generated by the signal generating unit 21 may be set in advance by the control unit 10, for example. The signal generated by the signal generating unit 21 may be stored in advance in the storage unit 40 or the like, for example. Since chirp signals used in a technical field such as the radar are known, more detailed description is appropriately simplified or omitted. The signal generated by the signal generating unit 21 is supplied to the synthesizer 22.

Figure 3:
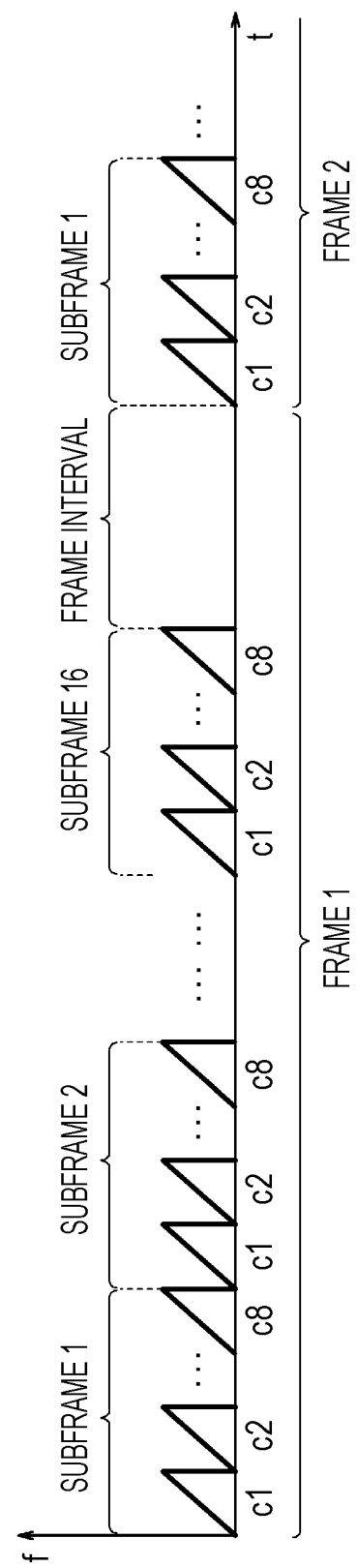
FIG. 3 is a diagram for describing a configuration of a transmission signal according to the one embodiment.

FIG. 3 is a diagram for describing an example of chirp signals generated by the signal generating unit 21.

In FIG. 3, the horizontal axis represents elapsed time, and the vertical axis represents a frequency. In the example illustrated in FIG. 3, the signal generating unit 21 generates linear chirp signals whose frequency changes linearly and periodically. In FIG. 3, the individual chirp signals are denoted by $c_1, c_2, \ldots, c_8$. As illustrated in FIG. 3, the frequency of each chirp signal linearly increases as time elapses.

In the example illustrated in FIG. 3, eight chirp signals $c_1, c_2, \ldots, c_8$ constitute one subframe. That is, each of subframes such as a subframe 1 and a subframe 2 illustrated in FIG. 3 includes eight chirp signals $c_1, c_2, \ldots, c_8$. In the example illustrated in FIG. 3, 16 subframes such as the subframes 1 to 16 constitute one frame. That is, each of frames such as a frame 1 and a frame 2 illustrated in FIG. 3 includes 16 subframes. As illustrated in FIG. 3, a frame interval of a predetermined length may be included between frames. One frame illustrated in FIG. 3 may have a length of about 30 ms to 50 ms, for example.

In FIG. 3, the frame 2 and subsequent frames may have the same and/or similar configuration. In FIG. 3, the frame 3 and subsequent frames may have the same and/or similar configuration. In the electronic device 1 according to the one embodiment, the signal generating unit 21 may generate a transmission signal as any number of frames. In FIG. 3, an illustration of some chirp signals is omitted. As described above, a relationship between time and a frequency of the transmission signal generated by the signal generating unit 21 may be stored in the storage unit 40 or the like, for example.

As described above, the electronic device 1 according to the one embodiment may transmit a transmission signal constituted by subframes each including a plurality of chirp signals. The electronic device 1 according to the one embodiment may transmit a transmission signal constituted by frames each including a predetermined number of subframes.

Description is given below on the assumption that the electronic device 1 transmits a transmission signal having a frame structure illustrated in FIG. 3. However, the frame structure illustrated in FIG. 3 is an example. For example, the number of chirp signals included in one subframe is not limited to eight. In the one embodiment, the signal generating unit 21 may generate a subframe including any number (for example, a plurality) of chirp signals. A subframe structure illustrated in FIG. 3 is also an example. For example, the number of subframes included in one frame is not limited to 16. In the one embodiment, the signal generating unit 21 may generate a frame including any number (for example, a plurality) of subframes. The signal generating unit 21 may generate signals having different frequencies. The signal generating unit 21 may generate a plurality of discrete signals of bandwidths in which frequencies f are different from each other.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from each of the transmission antennas 25. The frequency selected as the frequency of the transmission wave T to be transmitted from each of the transmission antennas 25 may be set by the control unit 10, for example. The frequency selected as the frequency of the transmission wave T to be transmitted from each of the transmission antennas 25 may be stored in the storage unit 40, for example. The signal whose frequency has been increased by the synthesizer 22 is supplied to the phase control unit 23 and the mixer 33. When the plurality of phase control units 23 are present, the signal whose frequency has been increased by the synthesizer 22 may be supplied to each of the plurality of phase control units 23. When the plurality of reception units 30 are present, the signal whose frequency has been increased by the synthesizer 22 may be supplied to the mixer 33 of each of the plurality of reception units 30.

Each of the phase control units 23 controls a phase of the transmission signal supplied from the synthesizer 22. Specifically, for example, in accordance with control performed by the control unit 10, each of the phase control units 23 may appropriately advance or delay the phase of the signal supplied from the synthesizer 22 to adjust the phase of the transmission signal. In this case, on the basis of a difference between paths of the transmission waves T to be transmitted from the plurality of transmission antennas 25, the phase control units 23 may adjust the phases of the respective transmission signals. The phase control units 23 appropriately adjust the phases of the respective transmission signals, so that the transmission waves T transmitted from the plurality of transmission antennas 25 enhance with each other in a predetermined direction to form a beam (beamforming). In this case, a correlation between a direction of beamforming and amounts of phase by which the respective transmission signals transmitted by the plurality of transmission antennas 25 are to be controlled may be stored in the storage unit 40, for example. The transmission signal whose phase is controlled by each of the phase control units 23 is supplied to a respective one of the amplifiers 24.

The amplifier 24 amplifies power (electric power) of the transmission signal supplied from the phase control unit 23 in accordance with control performed by the control unit 10, for example. When the sensor 5 includes the plurality of transmission antennas 25, each of the plurality of amplifiers 24 may amplify power (electric power) of the transmission signal supplied from a respective one of the plurality of phase control units 23 in accordance with control performed by the control unit 10, for example. Since the technology for amplifying power of a transmission signal is already known, more detailed description is omitted. Each of the amplifiers 24 is connected to a respective one of the transmission antennas 25.

The transmission antenna 25 outputs (transmits), as the transmission wave T, the transmission signal amplified by the amplifier 24. That is, the transmission antenna 25 may transmit the transmission wave T. When the sensor 5 includes the plurality of transmission antennas 25, each of the plurality of transmission antennas 25 may output (transmit), as the transmission wave T, the transmission signal amplified by a respective one of the plurality of amplifiers 24. Since the transmission antennas 25 can be configured in a manner that is the same as and/or similar to that of transmission antennas for use in the known radar technology, more detailed description is omitted.

The electronic device 1 according to the one embodiment includes the transmission antennas 25 and is capable of transmitting transmission signals (for example, transmission chirp signals) as the transmission waves T from the respective transmission antennas 25 in this manner. At least one of the functional units constituting the electronic device 1 may be housed in one housing. In this case, the one housing may have a hard-to-open structure. For example, the transmission antennas 25, the reception antennas 31, and the amplifiers 24 are desirably housed in one housing, and this housing desirably has a hard-to-open structure. When the sensor 5 is installed on the mobility device 100 such as an automobile, each of the transmission antennas 25 may transmit the transmission wave T to outside the mobility device 100 through a cover member such as a radar cover, for example. In this case, the radar cover may be made of a material, for example, a synthetic resin or rubber, that allows electromagnetic waves to pass therethrough. This radar cover may also serve as a housing of the sensor 5, for example. The transmission antennas 25 are covered with a member such as the radar cover, so that a risk of the transmission antennas 25 being damaged or malfunctioning because of a contact with an external object can be reduced. The radar cover and the housing may also be referred to as a radome.

FIG. 2 illustrates an example in which the electronic device 1 includes two transmission antennas 25. However, in the one embodiment, the electronic device 1 may include any number of transmission antennas 25. On the other hand, in the one embodiment, the electronic device 1 may include the plurality of transmission antennas 25 in the case where the transmission waves T transmitted from the respective transmission antennas 25 form a beam in a predetermined direction. In the one embodiment, the electronic device 1 may include a plurality of transmission antennas 25. In this case, the electronic device 1 may include the plurality of phase control units 23 and the plurality of amplifiers 24 to correspond to the plurality of transmission antennas 25. Each of the plurality of phase control units 23 may control the phase of a respective one of the plurality of transmission waves supplied from the synthesizer 22 and to be transmitted from the plurality of transmission antennas 25. Each of the plurality of amplifiers 24 may amplify power of a respective one of the plurality of transmission signals to be transmitted from the plurality of transmission antennas 25. In this case, the sensor 5 may include the plurality of transmission antennas. As described above, when the electronic device 1 illustrated FIG. 2 includes the plurality of transmission antennas 25, the electronic device 1 may include a plurality of functional units necessary for transmitting the transmission waves T from the plurality of transmission antennas 25.

The reception antenna 31 receives the reflected wave R. The reflected wave R may be the transmission wave T reflected off the predetermined object 200. That is, the reception antenna 31 may receive the reflected wave R that is the reflected transmission wave T. As the reception antenna 31, a plurality of antennas such as the reception antennas 31A to 31D, for example, may be included. Since the reception antennas 31 can be configured in a manner that is the same as and/or similar to that of reception antennas for use in the known radar technology, more detailed description is omitted. The reception antenna 31 is connected to the LNA 32. A reception signal based on the reflected wave R received by the reception antenna 31 is supplied to the LNA 32.

The electronic device 1 according to the one embodiment can receive, from each of the plurality of reception antennas 31, the reflected wave R that is the transmission wave T that has been transmitted as the transmission signal (transmission chirp signal) such as a chirp signal, for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the sensor 5 is installed on the mobility device 100 such as an automobile, each of the reception antennas 31 may receive the reflected wave R from outside the mobility device 100 through a cover member such as a radar cover, for example. In this case, the radar cover may be made of a material, for example, a synthetic resin or rubber, that allows electromagnetic waves to pass therethrough. This radar cover may also serve as a housing of the sensor 5, for example. The reception antennas 31 are covered with a member such as the radar cover, so that a risk of the reception antennas 31 being damaged or malfunctioning because of a contact with an external object can be reduced. The radar cover and the housing may also be referred to as a radome.

When the reception antennas 31 are installed near the transmission antennas 25, these may be collectively included in one sensor 5. That is, for example, one sensor 5 may include at least one transmission antenna 25 and at least one reception antenna 31. For example, one sensor 5 may include the plurality of transmission antennas 25 and the plurality of reception antennas 31. In such a case, one radar sensor may be covered with a cover member such as one radar cover, for example.

The LNA 32 amplifies, with low noise, the reception signal based on the reflected wave R received by the reception antenna 31. The LNA 32 may be a low-noise amplifier and amplifies, with low noise, the reception signal supplied from the reception antenna 31. The reception signal amplified by the LNA 32 is supplied to the mixer 33.

The mixer 33 mixes (multiplies) the reception signal having a radio frequency (RF) supplied from the LNA 32 and the transmission signal supplied from the synthesizer 22 to generate a beat signal. The beat signal obtained by the mixer 33 through mixing is supplied to the IF unit 34.

The IF unit 34 performs frequency conversion on the beat signal supplied from the mixer 33 to decrease the frequency of the beat signal to an intermediate frequency (IF). The beat signal whose frequency has been decreased by the IF unit 34 is supplied to the AD conversion unit 35.

The AD conversion unit 35 digitizes the analog beat signal supplied from the IF unit 34. The AD conversion unit 35 may be constituted by any analog-to-digital conversion circuit (Analog to Digital Converter (ADC)). The digitized beat signal obtained by the AD conversion unit 35 is supplied to the distance FFT processing unit 11 of the control unit 10. When the plurality of reception units 30 are present, the digitized beat signals obtained by the plurality of AD conversion units 35 may be supplied to the distance FFT processing unit 11.

The distance FFT processing unit 11 estimates a distance between the mobility device 100 equipped with the electronic device 1 and the object 200 on the basis of the beat signals supplied from the respective AD conversion units 35. The distance FFT processing unit 11 may include a processing unit that performs fast Fourier transform, for example. In this case, the distance FFT processing unit 11 may be constituted by any circuit, any chip, or the like that performs fast Fourier transform (FFT). The distance FFT processing unit 11 may preform Fourier transform other than fast Fourier transform.

The distance FFT processing unit 11 performs FFT processing (hereinafter, appropriately referred to as "distance FFT processing") on the digitized beat signals obtained by the AD conversion units 35. For example, the distance FFT processing unit 11 may perform the FFT processing on a complex signal supplied from each of the AD conversion units 35. The digitized beat signal obtained by each of the AD conversion units 35 can be represented as a temporal change in signal intensity (power). The distance FFT processing unit 11 performs FFT processing on such a beat signal, so that the beat signal can be represented as a signal intensity (power) for each frequency. If a peak in a result obtained by the distance FFT processing is equal to or greater than a predetermined threshold, the distance FFT processing unit 11 may determine that the predetermined object 200 is located at the distance corresponding to the peak. For example, there is known a method for determining that an object (reflecting object) is present that reflects a transmission wave, when a peak value that is equal to or greater than a threshold is detected from the average power or amplitude of a disturbance signal, such as constant false alarm rate (CFAR)-based detection processing.

As described above, the electronic device 1 according to the one embodiment can detect, as the target, the object 200 that reflects the transmission wave T on the basis of the transmission signal transmitted as the transmission wave T and the reception signal received as the reflected wave R. In the one embodiment, the operation described above may be performed by the control unit 10 of the electronic device 1.

The distance FFT processing unit 11 can estimate a distance to the predetermined object on the basis of one chirp signal (for example, c1 illustrated in FIG. 3). That is, the electronic device 1 can measure (estimate) the distance L illustrated in FIG. 1 by performing the distance FFT processing. Since a technique for measuring (estimating) a distance to a predetermined object by performing FFT processing on a beat signal is known, more detailed description is appropriately simplified or omitted. The results (for example, distance information) of the distance FFT processing performed by the distance FFT processing unit 11 may be supplied to the velocity FFT processing unit 13. The results of the distance FFT processing performed by the distance FFT processing unit 11 may also be supplied to the distance FFT processing unit 13 and/or the object detecting unit 16, etc.

The distance detection determining unit 12 performs determination processing for a distance on the basis of the results of the distance FFT processing performed by the distance FFT processing unit 11. For example, specifically, the distance detection determining unit 12 may determine that an object is present at the distance if a peak in the results of the distance FFT processing performed by the distance FFT processing unit 11 is greater than or equal to a predetermined threshold. As described above, the distance detection determining unit 12 determines whether the target is detected at a predetermined distance.

The velocity FFT processing unit 13 estimates a relative velocity between the mobility device 100 equipped with the electronic device 1 and the object 200 on the basis of the beat signals on which the distance FFT processing has been performed by the distance FFT processing unit 11. The velocity FFT processing unit 13 may include a processing unit that performs fast Fourier transform, for example. In this case, the velocity FFT processing unit 13 may be configured by any circuit, any chip, or the like that performs fast Fourier transform (FFT) processing. The velocity FFT processing unit 13 may preform Fourier transform other than fast Fourier transform.

The velocity FFT processing unit 13 further performs FFT processing (hereinafter, appropriately referred to as "velocity FFT processing") on each beat signal on which the distance FFT processing has been performed by the distance FFT processing unit 11. For example, the velocity FFT processing unit 13 may perform the FFT processing on a complex signal supplied from the distance FFT processing unit 11. The velocity FFT processing unit 13 can estimate a relative velocity to the predetermined object on the basis of a subframe (for example, the subframe 1 illustrated in FIG. 3) including chirp signals. When the distance FFT processing is performed on the beat signal in the above-described manner, a plurality of vectors can be generated. The velocity FFT processing unit 13 can estimate a relative velocity to the predetermined object by determining a phase of a peak in a result of the velocity FFT processing performed on the plurality of vectors. That is, the electronic device 1 can measure (estimate) a relative velocity between the mobility device 100 and the predetermined object 200 illustrated in FIG. 1 by performing the velocity FFT processing. Since a technique for measuring (estimating) a relative velocity to a predetermined object by performing velocity FFT processing on a result of distance FFT processing is known, more detailed description is appropriately simplified or omitted. Results (for example, velocity information) of the velocity FFT processing performed by the velocity FFT processing unit 13 may be supplied to the velocity detection determining unit 14. The results of the velocity FFT processing performed by the velocity FFT processing unit 13 may also be supplied to the angle-of-arrival estimating unit 15 and/or the object detecting unit 16, etc.

The velocity detection determining unit 14 performs determination processing for a velocity on the basis of the results of the velocity FFT processing performed by the velocity FFT processing unit 13. For example, specifically, the velocity detection determining unit 14 may determine that an object is present at the velocity if a peak in the results of the velocity FFT processing performed by the velocity FFT processing unit 13 is greater than or equal to a predetermined threshold. As described above, the velocity detection determining unit 14 determines whether the target is detected at a predetermined velocity.

The angle-of-arrival estimating unit 15 estimates a direction from which the reflected wave R arrives from the predetermined object 200 on the basis of the results of the velocity FFT processing performed by the velocity FFT processing unit 13. The electronic device 1 can estimate the direction from which the reflected wave R arrives by receiving the reflected wave R from the plurality of reception antennas 31. For example, the plurality of reception antennas 31 are arranged at a predetermined interval. In this case, the transmission wave T transmitted from each of the transmission antennas 25 is reflected off the predetermined object 200 to become the reflected wave R. Each of the plurality of reception antennas 31 arranged at the predetermined interval receives the reflected wave R. The angle-of-arrival estimating unit 15 can estimate the direction from which the reflected wave R arrives at each of the plurality of reception antennas 31 on the basis of the phase of the reflected wave R received by the reception antenna 31 and a difference in path of the reflected wave R. That is, the electronic device 1 can measure (estimate) the angle of arrival θ illustrated in FIG. 1 on the basis of the results of the velocity FFT processing.

Various techniques for estimating a direction from which the reflected wave R arrives on the basis of a result of velocity FFT processing have been proposed. For example, MUSIC (MUltiple SIgnal Classification), ESPRIT (Estimation of Signal Parameters via Rotational Invariance Technique), and the like are known as known arriving direction estimation algorithms. Thus, more detailed description of the known techniques is appropriately simplified or omitted. Information (angle information) on the angle of arrival θ estimated by the angle-of-arrival estimating unit 15 may be supplied to the object detecting unit 16.

The object detecting unit 16 detects an object located in a range in which the transmission wave T is transmitted, on the basis of the information supplied from at least any of the distance FFT processing unit 11, the velocity FFT processing unit 13, and the angle-of-arrival estimating unit 15. The object detecting unit 16 may perform detection of an object by performing, for example, clustering processing on the basis of the supplied distance information, velocity information, and angle information. For example, DBSCAN (Density-based spatial clustering of applications with noise) or the like is known as an algorithm used in clustering of data. In the clustering processing, for example, average power of points constituting the detected object may be calculated. The distance information, the velocity information, the angle information, and the power information of the object detected by the object detecting unit 16 may be supplied to the ECU 50 or the like, for example. In this case, when the mobility device 100 is an automobile, communication may be performed using a communication interface such as a CAN (Controller Area Network), for example.

The ECU 50 included in the electronic device 1 according to the one embodiment is capable of controlling the functional units of the mobility device 100 and also controlling operations of the entire mobility device 100. To provide control and processing capabilities for executing various functions, the ECU 50 may include at least one processor, for example, a CPU (Central Processing Unit). The ECU 50 may be collectively implemented by one processor, may be implemented by some processors, or may be implemented by discrete individual processors. The processor may be implemented as one integrated circuit. The integrated circuit is also referred to as an IC. The processor may be implemented as a plurality of integrated circuits and discrete circuits connected to be able to perform communication. The processor may be implemented on the basis of various other known technologies. In the one embodiment, the ECU 50 may be configured as, for example, a CPU and a program executed by the CPU. The ECU 50 may appropriately include a memory required for operations of the ECU 50. At least part of the functions of the control unit 10 may be functions of the ECU 50, or at least part of the functions of the ECU 50 may be functions of the control unit 10.

The electronic device 1 illustrated in FIG. 2 includes the two transmission antennas 25 and the four reception antennas 31. However, the electronic device 1 according to the one embodiment may include any number of transmission antennas 25 and any number of reception antennas 31. For example, by including the two transmission antennas 25 and the four reception antennas 31, the electronic device 1 can be regarded to include a virtual antenna array that is virtually constituted by eight antennas. As described above, the electronic device 1 may receive the reflected wave R of 16 subframes illustrated in FIG. 3 by using, for example, the eight virtual antennas.

Target detection processing performed by the electronic device 1 according to the one embodiment is described next.

Examples of recent sensors capable of detecting an obstacle located around a vehicle such as an automobile include various sensors such as a millimeter-wave radar, a LiDAR (Light Detection and Ranging, Laser Imaging Detection and Ranging), or an ultrasonic sensor. Among these sensors, a millimeter-wave radar is often employed from the viewpoint of accuracy, reliability, and cost of obstacle detection.

Examples of techniques for detecting an obstacle or the like located around a vehicle by using a millimeter-wave radar include, for example, blind spot detection (BSD), cross traffic alert (CTA) during backward movement or exiting from a parking, and free space detection (FSD). In such detection, a radio wave radiation range that is dependent on a physical shape of an antenna of a millimeter wave radar is commonly set in advance to determine an object detection range. That is, in each radar, the physical shape of the antenna of the millimeter-wave radar is commonly determined in advance depending on the use purpose, function, or the like of the radar, and the specification of the object detection range is also commonly defined in advance. Thus, a plurality of different radar sensors are needed to implement functions of a plurality of different radars.

However, preparing a plurality of radar sensors depending on the use purpose or function is disadvantageous from the viewpoint of cost. For example, when the physical shape of the antenna is determined in advance and the radiation range is also determined, it is difficult to change the use purpose and function of the antenna. For example, when the physical shape and the radiation range of the antenna are determined and all objects located within the radiation range are detected, an amount of information to be processed increases. In this case, since an unnecessary object may also be erroneously detected as a target, the reliability of detection may decrease. For example, when the physical shape and the radiation range of the antenna are determined and the number of installed sensors is increased, the weight of the vehicle (mainly harness) increases to decrease fuel efficiency or the power consumption increases to decrease fuel efficiency. When detection is performed by using a plurality of radar sensors, a delay may occur between the sensors. Therefore, when automated driving, driving assist, or the like is performed on the basis of such detection, processing may take time. This is because a processing speed of the CAN is slower than an update rate of the radar, and feedback also takes time. When detection is performed by using a plurality of sensors having different object detection ranges, control may become complicated.

Accordingly, the electronic device 1 according to the one embodiment enables one radar sensor to be used for a plurality of functions or use purposes. The electronic device 1 according to the one embodiment enables one radar sensor to perform operations as if the one radar sensor simultaneously implemented the plurality of functions or use purposes.

Figure 4:
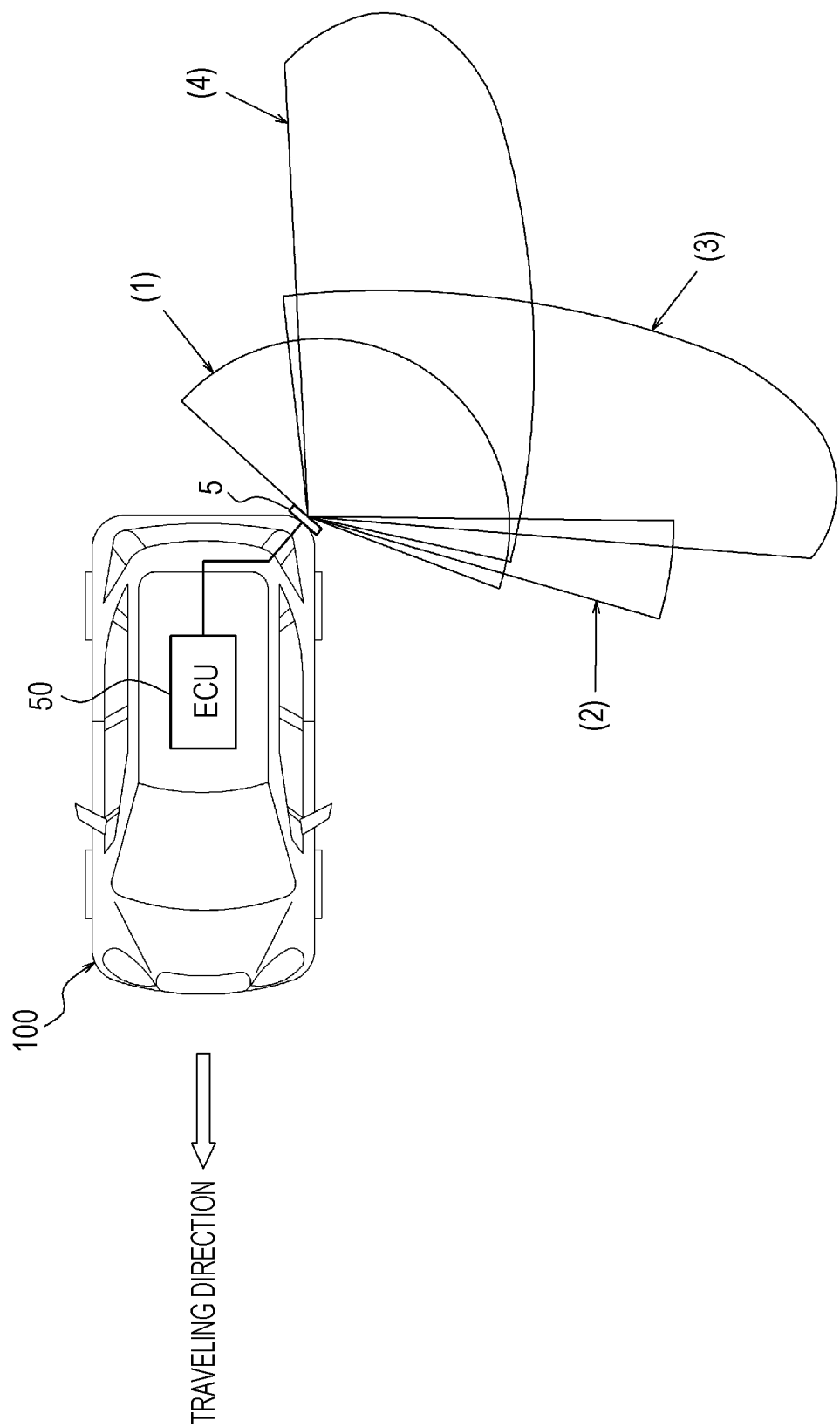
FIG. 4 is a diagram for describing object detection ranges of the electronic device according to the one embodiment.

FIG. 4 is a diagram for describing an example of an operation of the electronic device 1 according to the one embodiment.

The electronic device 1 according to the one embodiment is mounted in the mobility device 100 illustrated in FIG. 4. As illustrated in FIG. 4, least one sensor 5 is installed at a left rear portion of the mobility device 100. As illustrated in FIG. 4, the sensor 5 is connected to the ECU 50 mounted in the mobility device 100. In the mobility device 100 illustrated in FIG. 4, the sensor 5 that operates in the same and/or similar manner as the sensor 5 installed at the left rear portion may be installed at a portion other than the left rear portion. In the following description, the one sensor 5 installed at the left rear portion alone is described, and description of the other sensors is omitted. In the following description, at least any of the control unit 10, the phase control units 23, and the ECU 50 can control each functional unit constituting the electronic device 1.

As illustrated in FIG. 4, the electronic device 1 according to the one embodiment is capable of detecting an object by selecting any of a plurality of detection ranges. The electronic device 1 according to the one embodiment is also capable of detecting an object by switching the detection range to any of the plurality of detection ranges. FIG. 4 illustrates ranges in which an object is detected on the basis of transmission signals transmitted by the electronic device 1 (specifically, the sensor 5) according to the one embodiment and reception signals received by the electronic device 1 (specifically, the sensor 5).

For example, when the electronic device 1 according to the one embodiment is used for a use purpose or function for parking assist, for example, the electronic device 1 is capable of performing detection of an object in a range (1) illustrated in FIG. 4 serving as the object detection range. The object detection range (1) illustrated in FIG. 4 may be a range that is the same as or similar to an object detection range of a radar designed exclusively for parking assist, for example. For example, when the electronic device 1 according to the one embodiment is used for a use purpose or function for free space detection (FSD), for example, the electronic device 1 is capable of performing detection of an object in a range (2) illustrated in FIG. 4 serving as the object detection range. The object detection range (2) illustrated in FIG. 4 may be the same as or similar to an object detection range of a radar designed exclusively for free space detection (FSD), for example.

For example, when the electronic device 1 according to the one embodiment is used for a use purpose or function of exit collision detection (CTA), the electronic device 1 is capable of performing detection of an object in a range (3) illustrated in FIG. 4 serving as the object detection range. The object detection range (3) illustrated in FIG. 4 may be the same as or similar to an object detection range of a radar designed exclusively for exit collision detection (CTA), for example. For example, when the electronic device 1 according to the one embodiment is used for a use purpose or function of blind spot detection (BSD), the electronic device 1 is capable of performing detection of an object in a range (4) illustrated in FIG. 4 serving as the object detection range. The object detection range (4) illustrated in FIG. 4 may be the same as or similar to an object detection range of a radar designed exclusively for blind spot detection (BSD), for example.

The electronic device 1 according to the one embodiment is further capable of detecting an object by switching between a plurality of ranges, for example, the object detection ranges (1) to (4) illustrated in FIG. 4 in any manner. As described above, the plurality of ranges to be switched between in this case may be determined on the basis of, for example, an operation of a driver or the like of the mobility device 100, or may be determined on the basis of an instruction from the control unit 10, the ECU 50, or the like.

When the electronic device 1 according to the one embodiment performs detection of an object in the plurality of object detection ranges from among the object detection ranges (1) to (4) in this manner, the control unit 10 may determine the plurality of object detection ranges on the basis of any information. After determining the plurality of object detection ranges, the control unit 10 may set various parameters for transmitting a transmission signal and receiving a reception signal in the plurality of determined object detection ranges. The various parameters set by the control unit 10 may be stored in the storage unit 40, for example.

Such parameters may be determined on the basis of, for example, actual measurement performed in a test environment, before the electronic device 1 performs detection of an object. When such parameters are not stored in the storage unit 40, parameters appropriately estimated by the control unit 10 on the basis of predetermined data such as past measurement data may be used. When such parameters are not stored in the storage unit 40, the control unit 10 may acquire appropriate parameters by accessing an external device via a network, for example.

As described above, in the one embodiment, the control unit 10 detects an object that reflects the transmission wave T on the basis of the transmission signal transmitted as the transmission wave T and the reception signal received as the reflected wave R. In the one embodiment, the control unit 10 may enable a plurality of object detection ranges (for example, the object detection ranges (1) to (4) in FIG. 4) based on the transmission signal and the reception signal to be changed.

In the one embodiment, the control unit 10 may enable the plurality of object detection ranges to be switched between. For example, the control unit 10 that is performing detection of an object in the object detection range (3) may switch the range in which detection of an object is performed from the object detection range (3) to the object detection range (2). In the one embodiment, the control unit 10 may enable the plurality of object detection ranges to be changed depending on at least one of the use purpose and the function of object detection (such as, for example, parking assist (PA), blind spot detection (BSD), and so on). In the one embodiment, the control unit 10 may enable the plurality of object detection ranges to be changed as a short time elapses, as described later.

In the one embodiment, the control unit 10 may determine the plurality of object detection ranges on the basis of an object detection result. For example, when a predetermined object has already been detected through object detection, the control unit 10 may determine the plurality of object detection ranges in accordance with the location of the detected object. In the one embodiment, the control unit 10 may process only the transmission signal and the reception signal in any of the plurality of object detection ranges.

As described above, the electronic device 1 according to the one embodiment is capable of clipping (setting and/or switching) the detection range in detection of an object performed by using a millimeter-wave radar or the like, for example. Thus, the electronic device 1 according to the one embodiment is capable of flexibly adapting to a situation in which detection of an object in the plurality of object detection ranges is desired. The electronic device 1 according to the one embodiment is capable of setting a wide object detection range in advance and clipping information only for a necessary detection range on the basis of information on a distance and/or an angle detected by the electronic device 1. Thus, the electronic device 1 according to the one embodiment can process information for the necessary detection range without increasing a processing load. Therefore, the electronic device 1 according to the one embodiment can improve the convenience in detection of an object.

The electronic device 1 according to the one embodiment enables the object detection range based on the transmission signal and the reception signal to be changed as illustrated in FIG. 4. The electronic device 1 may also direct a beam of the transmission waves T toward the object detection range. In this manner, the electronic device 1 according to the one embodiment can perform detection of an object in a desired clipping range with high accuracy.

For example, as described above, as the use purpose or function of blind spot detection (BSD), the electronic device 1 according to the one embodiment is capable of performing detection of an object by selecting the object detection range (4) from among the plurality of detection ranges illustrated in FIG. 4. The electronic device 1 according to the one embodiment may further form a beam (perform beamforming) of the transmission waves T transmitted from the plurality of transmission antennas 25 toward the object detection range (4). For example, when detection of a far object is performed, the object detection range can be covered with high accuracy by performing beamforming with the beam of the transmission waves transmitted from the plurality of transmission antennas 25 toward that direction.

FIGS. 5 and 6 are diagrams illustrating examples of arrangement of the transmission antennas and the reception antennas in the electronic device according to the one embodiment.

As illustrated in FIG. 5, the sensor 5 of the electronic device 1 according to the one embodiment may include, for example, the two transmission antennas 25A and 25A'. As illustrated in FIG. 5, the sensor 5 of the electronic device 1 according to the one embodiment may include the four reception antennas 31A, 31B, 31C, and 31D.

The four reception antennas 31A, 31B, 31C, and 31D are arranged in the horizontal direction (in an X-axis direction) at an interval of $\lambda/2$, where $\lambda$ denotes a wavelength of the transmission wave T. By arranging the plurality of reception antennas 31 in the horizontal direction and receiving the transmission wave T with the plurality of reception antennas 31 in this manner, the electronic device 1 can estimate the direction from which the reflected wave R arrives. The wavelength A of the transmission wave T may be a wavelength of the transmission wave T having a center frequency of 79 GHz when a frequency band of the transmission wave T is, for example, from 77 GHz to 81 GHz.

The two transmission antennas 25A and 25A' are arranged in a vertical direction (a Z-axis direction) at the interval of $\lambda/2$, where $\lambda$ denotes the wavelength of the transmission wave T. By arranging the plurality of transmission antennas 25 in the vertical direction and transmitting the transmission waves T with the plurality of transmission antennas 25 in this manner, the electronic device 1 can change the direction of the beam of the transmission waves T in the vertical direction.

As illustrated in FIG. 6, the sensor 5 of the electronic device 1 according to the one embodiment may include, for example, four transmission antennas 25A, 25A', 25B, and 25B'.

As illustrated in FIG. 6, the two transmission antennas 25A and 25B are arranged in the horizontal direction (the X-axis direction) at the interval of $\lambda/2$, where $\lambda$ denotes the wavelength of the transmission wave T. As illustrated in FIG. 6, the two transmission antennas 25A' and 25B' are arranged also in the horizontal direction (the X-axis direction) at the interval of $\lambda/2$, where $\lambda$ denotes the wavelength of the transmission wave T. By arranging the plurality of transmission antennas 25 in the horizontal direction and transmitting the transmission waves T with the plurality of transmission antennas 25 in this manner, the electronic device 1 can change the direction of the beam of the transmission waves T also in the horizontal direction.

On the other hand, as illustrated in FIG. 6, the two transmission antennas 25A and 25A' are arranged in the vertical direction (the Z-axis direction) at the interval of $\lambda/2$, where $\lambda$ denotes the wavelength of the transmission wave T. As illustrated in FIG. 6, the two transmission antennas 25B and 25B' are also arranged in the vertical direction (the Z-axis direction) at the interval of $\lambda/2$, where $\lambda$ denotes the wavelength of the transmission wave T. Also in the arrangement illustrated in FIG. 6, by arranging the plurality of transmission antennas 25 in the vertical direction and transmitting the transmission waves T with the plurality of transmission antennas 25 in this manner, the electronic device 1 can change the direction of the beam of the transmission waves T in the vertical direction.

When the electronic device 1 according to the one embodiment performs beamforming of the transmission waves T transmitted from the plurality of transmission antennas 25, the plurality of transmission waves T may be set in phase in a predetermined direction on the basis of a difference between paths along which the transmission waves T are transmitted. In the electronic device 1 according to the one embodiment, in order to set the individual transmission waves T in phase in a predetermined direction, for example, the phase control units 23 may control the phase of at least one of the transmission waves transmitted from the plurality of transmission antennas 25.

An amount of phase to be controlled to set the plurality of transmission waves T in phase in a predetermined direction may be stored in the storage unit 40 in association with the predetermined direction. That is, a relationship between a direction of the beam and an amount of phase for beamforming may be stored in the storage unit 40.

Such a relationship may be determined on the basis of actual measurement performed in a test environment, for example, before the electronic device 1 performs detection of an object. When such a relationship is not stored in the storage unit 40, a relationship appropriately estimated by the phase control units 23 on the basis of predetermined data such as past measurement data may be used. When such a relationship is not stored in the storage unit 40, the phase control units 23 may acquire an appropriate relationship by connecting to an external device via a network, for example.

In the electronic device 1 according to the one embodiment, at least one of the control unit 10 and the phase control units 23 may perform control for performing beamforming of the transmission waves T transmitted from the plurality of transmission antennas 25. In the electronic device 1 according to the one embodiment, a functional unit including at least the phase control units 23 is also referred to as a transmission control unit.

As described above, in the electronic device 1 according to the one embodiment, the transmission antenna 25 may include a plurality of transmission antennas. In the electronic device 1 according to the one embodiment, the reception antenna 31 may also include a plurality of reception antennas. In the electronic device 1 according to the one embodiment, the transmission control unit (for example, the phase control units 23) may perform control such that the transmission waves T transmitted from the plurality of transmission antennas 25 form a beam in a predetermined direction (beamforming). In the electronic device 1 according to the one embodiment, the transmission control unit (for example, the phase control units 23) may form a beam toward the object detection range.

In the electronic device 1 according to the one embodiment, the transmission antennas 25 may include a plurality of transmission antennas 25 arranged to include a vertical direction component as described above. In this case, in the electronic device 1 according to the one embodiment, the phase control units 23 (transmission control unit) may change the direction of the beam to the direction of the object detection range with the vertical direction component included.

In the electronic device 1 according to the one embodiment, the transmission antennas 25 may include a plurality of transmission antennas 25 arranged to include a horizontal direction component as described above. In this case, in the electronic device 1 according to the one embodiment, the phase control units 23 (transmission control unit) may change the direction of the beam to the direction of the object detection range with the horizontal direction component included.

In the electronic device 1 according to the one embodiment, the transmission control unit (for example, the phase control units 23) may form a beam in a direction that covers at least part of the object detection range. In the electronic device 1 according to the one embodiment, the transmission control unit (for example, the phase control units 23) may control the phase of at least one of the plurality of transmission waves such that the transmission waves T each transmitted from a respective one of the plurality of transmission antennas 25 are in phase in a predetermined direction.

The electronic device 1 according to the one embodiment is capable of calculating a phase compensation value on the basis of frequency information of wide frequency band signals (for example, FMCW signals) output from the plurality of transmission antennas 25 and performing frequency-dependent phase compensation for each of the plurality of transmission antennas. Consequently, the electronic device 1 according to the one embodiment can perform, with high accuracy, beamforming in a particular direction in the entire frequency band which the transmission signal can have.

Such beamforming can extend an object detectable distance in a particular direction in which object detection is needed. The beamforming described above can reduce a reflected signal from an unnecessary direction. Therefore, the accuracy of detecting the distance and/or the angle can be improved.

Figure 7:
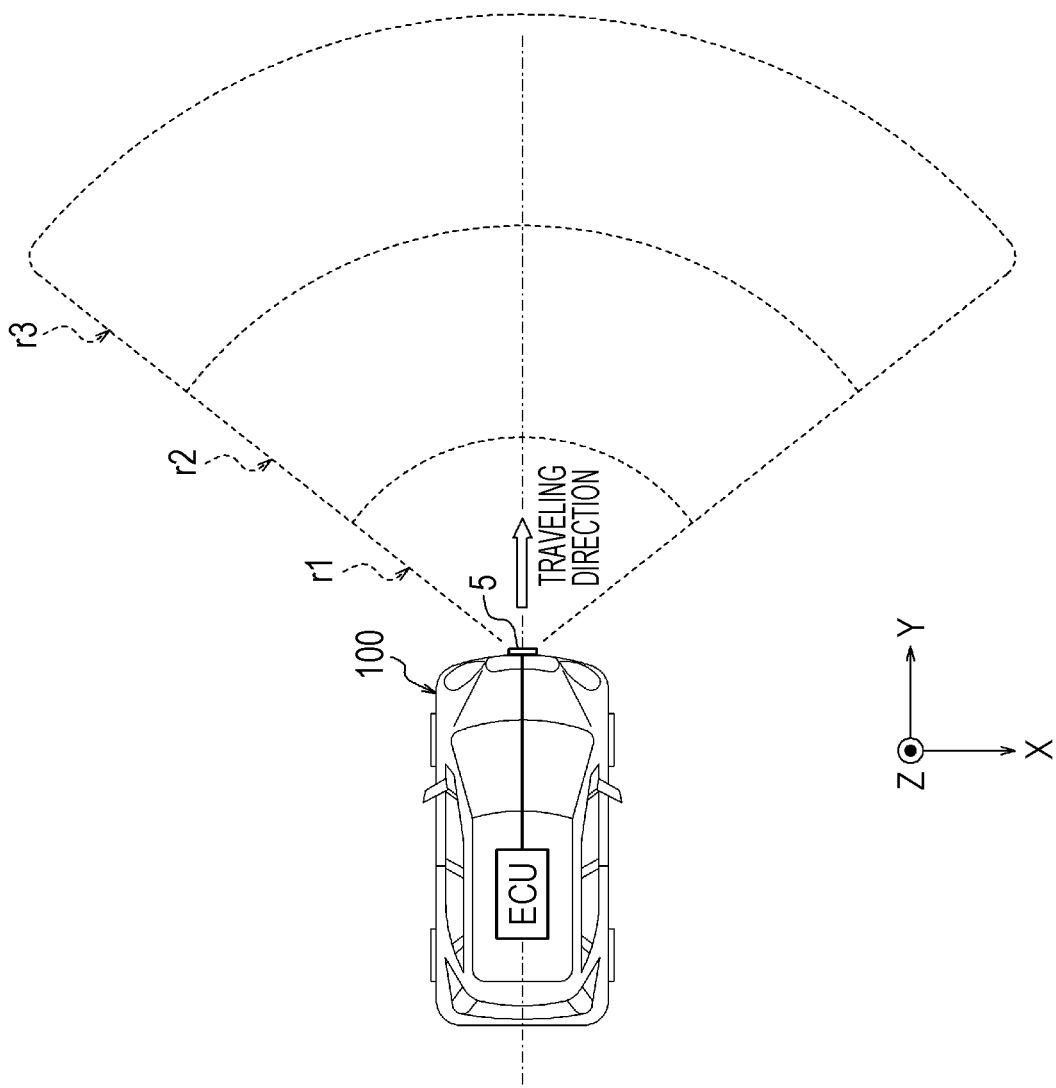
FIG. 7 is a diagram for describing a distance within which the electronic device according to the one embodiment performs detection of an object.

FIG. 7 is a diagram illustrating detection distances of a radar implemented by the electronic device 1 according to the one embodiment.

As described above, the electronic device 1 according to the one embodiment is capable of clipping the object detection range and/or performing beamforming of the transmission waves. By employing at least one of such clipping of the object detection range and beamforming of the transmission waves, the electronic device 1 is capable of defining a distance range in which an object is detectable on the basis of the transmission signal and the reception signal.

As illustrated in FIG. 7, the electronic device 1 according to the one embodiment is capable of performing detection of an object in a range r1, for example. The range r1 illustrated in FIG. 7 may be a range in which detection of an object can be performed by an ultra-short range radar (USRR), for example. As illustrated in FIG. 7, the electronic device 1 according to the one embodiment is also capable of performing detection of an object in a range r2, for example. The range r2 illustrated in FIG. 7 may be a range in which detection of an object can be performed by a short-range radar (SRR), for example. As illustrated in FIG. 7, the electronic device 1 according to the one embodiment is further capable of performing detection of an object in a range r3, for example. The range r3 illustrated in FIG. 7 may be a range in which detection of an object can be performed by a mid-range radar (MRR), for example. As described above, the electronic device 1 according to the one embodiment is capable of performing detection of an object by appropriately switching the range to any of the ranges r1, r2, and r3, for example. In such a radar having different detection distances, the distance measurement accuracy (measurement resolution) tends to decrease as the detection distance increases.

As described above, in the electronic device 1 according to the one embodiment, the control unit 10 may set the distance range in which detection of an object is performed on the basis of the transmission signal and the reception signal, in accordance with any of the plurality of object detection ranges.

Different radar types of the electronic device 1 according to the one embodiment is described next. The electronic device 1 according to the one embodiment can function as a plurality of types of radars, for example. That is, the electronic device 1 according to the one embodiment can transmit different transmission waves T for the plurality of radar types.

Figure 8:
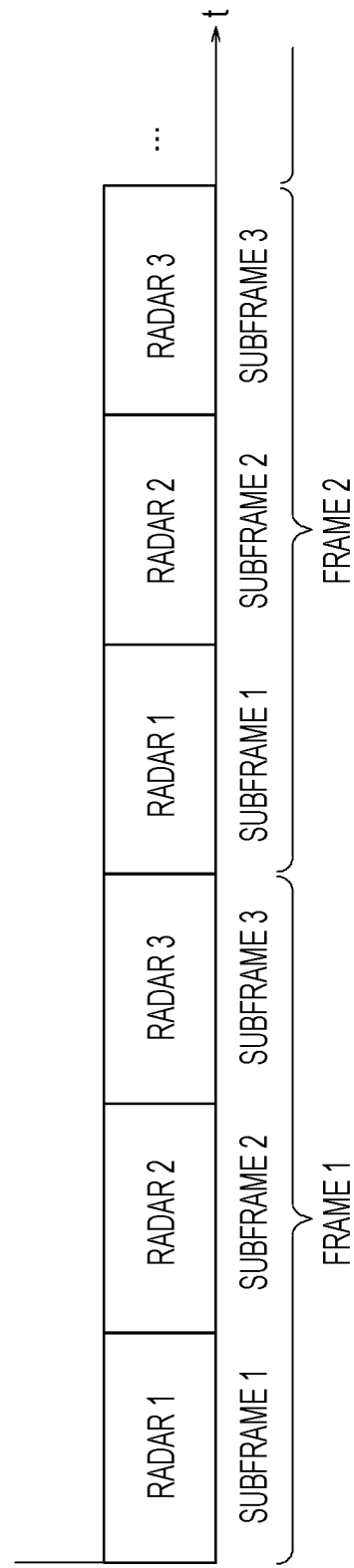
FIG. 8 is a diagram for describing an example of frames in which radar types are set in the one embodiment.
Figure 9:
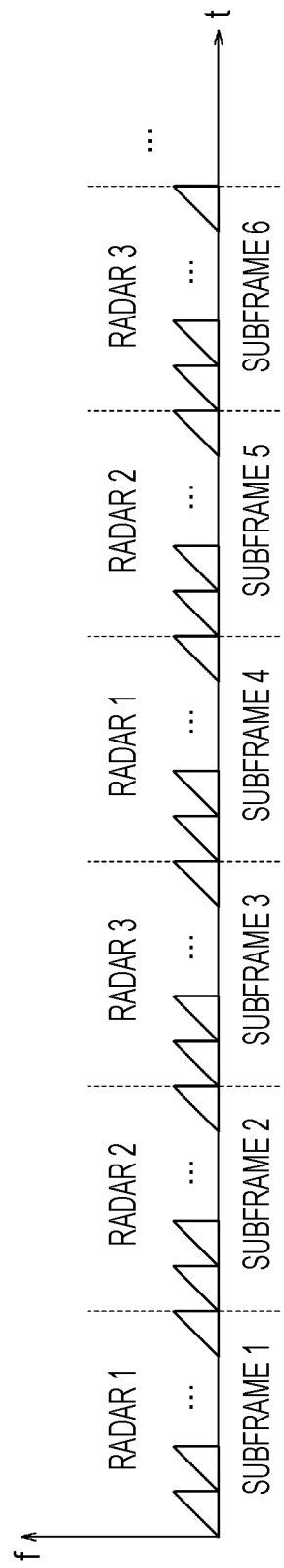
FIG. 9 is a diagram for describing an example in which the radar types are set for individual portions (subframes) constituting a frame in the one embodiment.
Figure 10:
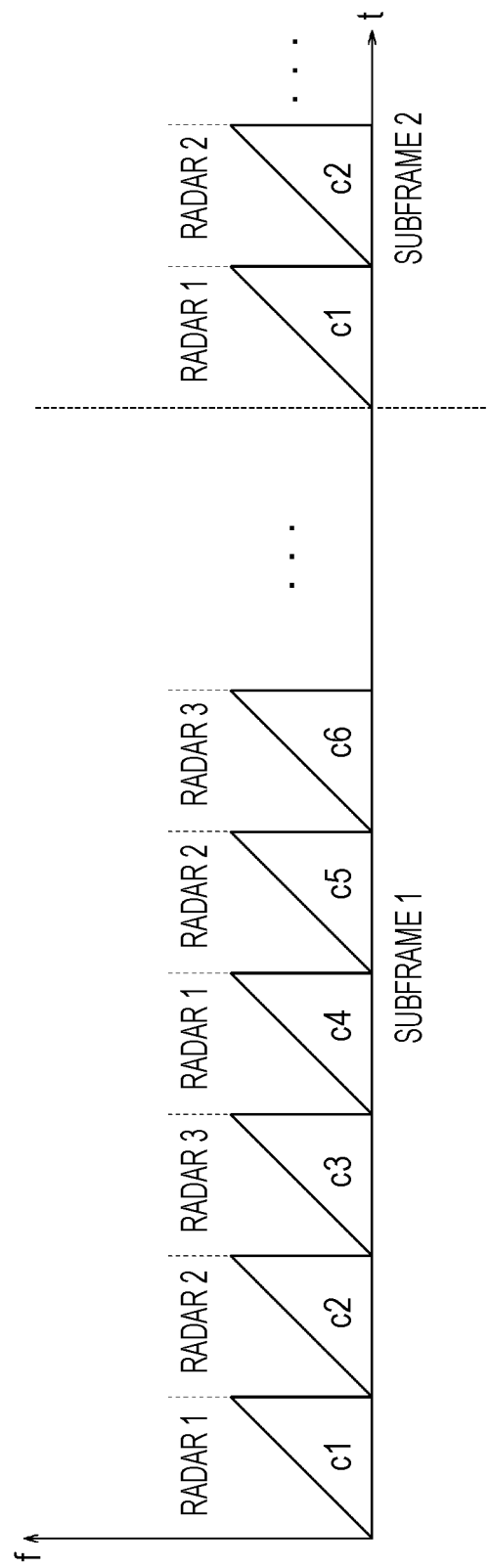
FIG. 10 is a diagram for describing an example in which the radar types are set for individual chirp signals constituting a frame in the one embodiment.

FIGS. 8 to 10 are diagrams illustrating how functions of the different types of radars are set (allocated) for individual frames or the like of the transmission wave T by the electronic device 1 according to the one embodiment.

FIG. 8 is a diagram illustrating frames of the transmission wave T as in FIG. 3. In the example illustrated in FIG. 8, frames 1 and 2 of the transmission wave T are illustrated. It may be assumed that frames follow thereafter.

Each frame illustrated in FIG. 3 includes 16 subframes as an example. In addition, each of the subframes included in each frame illustrated in FIG. 3 includes eight chirp signals as an example. However, the configuration of the frames and/or the subframes is not limited to the example illustrated in FIG. 3 in the electronic device 1 according to the one embodiment.

For example, the electronic device 1 according to the one embodiment may transmit the transmission wave T constituted by frames each including three subframes as in each frame illustrated in FIG. 8. In this case, each of these subframes may include, for example, eight chirp signals or may include any number of chirp signals.

For example, as illustrated in FIG. 8, the electronic device 1 according to the one embodiment may set (allocate) functions of different radar types for individual subframes of the transmission wave T. For example, the electronic device 1 according to the one embodiment may set any of a plurality of object detection ranges for each subframe of the transmission wave T, for example. As described above, in the electronic device 1 according to the one embodiment, the control unit 10 may set any of the plurality of object detection ranges for each frame of the transmission wave T or for each portion constituting a frame. For example, in the electronic device 1 according to the one embodiment, the control unit 10 may switch between the plurality of object detection ranges for each subframe of the transmission wave T and may transmit the transmission signal and receive the reception signal. In the example illustrated in FIG. 8, the function of a radar 1 is set for the subframe 1 of the transmission wave T, the function of a radar 2 is set for the subframe 2 of the transmission wave T, and the function of a radar 3 is set for the subframe 3 of the transmission wave T. The functions are repeatedly set in the same and/or similar manner thereafter. In the one embodiment, each frame (for example, the frame 1) of the transmission wave T may be on an order of several tens of microseconds, for example. Thus, the electronic device 1 according to the one embodiment functions as a different radar every very short time period. Therefore, the electronic device 1 according to the one embodiment operates as if radars of a plurality of types (for example, functions or use purposes) were simultaneously implemented by one radar sensor.

For example, the functions of the different types of radars described in FIG. 7 may be set (allocated) for individual subframes illustrated in FIG. 8. That is, for example, the function of the radar 1 set in the subframe 1 illustrated in FIG. 8 may perform detection of an object in the range r1 illustrated in FIG. 7. In addition, for example, the function of the radar 2 set in the subframe 2 illustrated in FIG. 8 may perform detection of an object in the range r2 illustrated in FIG. 7. In addition, for example, the function of the radar 3 set in the subframe 3 illustrated in FIG. 8 may perform detection of an object in the range r3 illustrated in FIG. 7. In the one embodiment, for example, the set (allocated) frequency bandwidth of the transmission wave T may be made different in accordance with the functions of the different types of radars.

FIG. 9 is a diagram illustrating subframes included in a frame of the transmission wave T as in FIG. 3. In the example illustrated in FIG. 9, subframes 1 to 6 of the transmission wave T are illustrated. It may be assumed that subframes follow thereafter. In addition, the subframe 1 to 6 illustrated in FIG. 9 may be some of the 16 subframes included in the frame 1 illustrated in FIG. 3, for example. Each of the subframes illustrated in FIG. 9 may include, for example, eight chirp signals as in each subframe illustrated in FIG. 3 or may include any number of chirp signals.

In the example illustrated in FIG. 8, the functions of the plurality of different radar types are set (allocated) for individual subframes of the transmission wave T. Alternatively, the electronic device 1 according to the one embodiment may set (allocate) the functions of the plurality of different radar types for individual frames of the transmission wave T, for example. In the one embodiment, each subframe of the transmission wave T may be shorter than one frame in time, for example. Thus, by setting the functions of the different radar types for individual subframes of the transmission wave T, the electronic device 1 according to the one embodiment can function as different radars every shorter time period than in the case where the functions of the different radar types are set for individual frames of the transmission wave T.

For example, as illustrated in FIG. 9, the electronic device 1 according to the one embodiment may set (allocate) functions of different radars for individual subframes of the transmission wave T. The electronic device 1 according to the one embodiment may set any of the plurality of object detection ranges for each subframe of the transmission wave T, for example. In the example illustrated in FIG. 9, one frame includes more than three (for example, six or more) subframes. As described above, the electronic device 1 according to the one embodiment may set the number of subframes included in each frame in various ways. In the example illustrated in FIG. 9, the function of the radar 1 is set for the subframe 1 of the transmission wave T, the function of the radar 2 is set for the subframe 2 of the transmission wave T, and the function of the radar 3 is set for the subframe 3 of the transmission wave T. As in the example illustrated in FIG. 9, the functions set in the subframes 1 to 3 of the transmission wave T may be set in the subframes 4 to 6 of the transmission wave T, respectively. In addition, in the example illustrated in FIG. 9, in subframes subsequent to the subframe 6, the functions set in the subframes 1 to 3 of the transmission wave T may be repeatedly set as appropriate.

For example, the functions of the different types of radars described in FIG. 7 may be set (allocated) for individual subframes illustrated in FIG. 9. That is, for example, the function of the radar 1 set in the subframes 1 and 4 illustrated in FIG. 9 may perform detection of an object in the range r1 illustrated in FIG. 7. In addition, for example, the function of the radar 2 set in the subframes 2 and 5 illustrated in FIG. 9 may perform detection of an object in the range r2 illustrated in FIG. 7. In addition, for example, the function of the radar 3 set in the subframes 3 and 6 illustrated in FIG. 9 may perform detection of an object in the range r3 illustrated in FIG. 7. In the one embodiment, for example, the set (allocated) frequency bandwidth of the transmission wave T may be made different in accordance with the functions of the different types of radars.

FIG. 10 is a diagram illustrating chirp signals included in each subframe of the transmission wave T as in FIG. 3. In the example illustrated in FIG. 10, the subframe 1 and part of the subframe 2 of the transmission wave T are illustrated. It may be assumed that subframes subsequent to the subframe 1 follow in a manner similar to that of the subframe 1. In addition, the subframe 1 illustrated in FIG. 10 may include eight chirp signals as in the subframe 1 illustrated in FIG. 3 or may include any number of chirp signals. In addition, each chirp signal illustrated in FIG. 10 may be the same as each of the eight chirp signals included in each subframe illustrated in FIG. 3 or may be different from the chirp signals illustrated in FIG. 3. In addition, the chirp signals included in each subframe in FIG. 10 may be only six chirp signals (c1 to c6) illustrated in FIG. 10.

For example, as illustrated in FIG. 10, the electronic device 1 according to the one embodiment may set (allocate) the functions of different radars for individual chirp signals included in each subframe of the transmission wave T. For example, the electronic device 1 according to the one embodiment may set any of the plurality of object detection ranges for each chirp signal of the transmission wave T, for example. As described above, in the electronic device 1 according to the one embodiment, the control unit 10 may set any of the plurality of object detection ranges based on the transmission signal and the reception signal, for each chirp signal constituting a frame of the transmission wave T. In the example illustrated in FIG. 10, the function of the radar 1 is set for the chirp signal c1 of the transmission wave T, the function of the radar 2 is set for the chirp signal c2 of the transmission wave T, and the function of the radar 3 is set for the chirp signal c3 of the transmission wave T. The functions are repeatedly set in the same and/or similar manner thereafter. In the one embodiment, each chirp signal of the transmission wave T may be shorter than one subframe in time, for example. Therefore, the electronic device 1 according to the one embodiment functions as a different radar every shorter time period. Therefore, the electronic device 1 according to the one embodiment operates as if a plurality of functions or use purposes were simultaneously implemented by one radar sensor.

For example, the functions of the different types of radars described in FIG. 7 may be set (allocated) for individual chirp signals illustrated in FIG. 10. That is, for example, the function of the radar 1 set in the chirp signals c1 and c4 illustrated in FIG. 10 may perform detection of an object in the range r1 illustrated in FIG. 7. In addition, for example, the function of the radar 2 set in the chirp signals c2 and c5 illustrated in FIG. 10 may perform detection of an object in the range r2 illustrated in FIG. 7. In addition, for example, the function of the radar 3 set in the chirp signals c3 and c6 illustrated in FIG. 10 may perform detection of an object in the range r3 illustrated in FIG. 7. In the one embodiment, for example, the set (allocated) frequency bandwidth of the transmission wave T may be made different in accordance with the functions of the different types of radars.

As described above, in accordance with various use purposes or functions, the electronic device 1 according to the one embodiment can perform clipping of a detection range and perform beamforming toward the clipped detection range. The electronic device 1 according to the one embodiment can also switch clipping of the detection range and beamforming toward the clipped detection range in any manner. Thus, one radar sensor can be used, for example, by dynamically switching between a plurality of use purposes or functions.

In addition, as described above, the electronic device 1 according to the one embodiment can function as a plurality of radars having different distance ranges in which an object is detectable. That is, the electronic device 1 according to the one embodiment can function as a plurality of radars having different accuracies (resolutions) with which an object is detectable. As described above, the electronic device 1 according to the one embodiment can switch between the plurality of types of radars in accordance with time sections.

A principle of how the electronic device 1 according to the one embodiment detects a walking or running person is described next.

Figure 11:
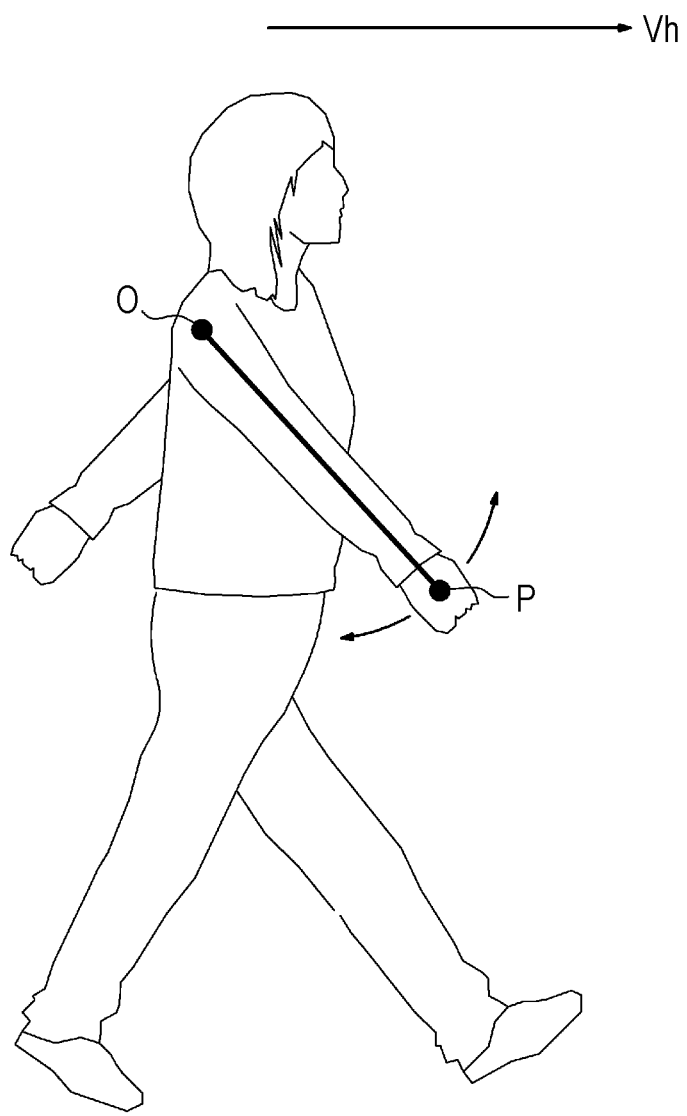
FIG. 11 is a diagram for describing a principle of how the electronic device according to the one embodiment detects a walking or running person.

FIG. 11 is a diagram illustrating a person who is walking. As illustrated in FIG. 11, when a person is walking or running, the person usually swings their arms in a manner of a pendulum motion. In general, regardless of whether a person is aware or not, the person is apt to walk or run while swinging their arms if the person is in a natural posture. Thus, the electronic device 1 according to the one embodiment may detect, for example, an arm swinging motion of a walking or running person as a motion characteristic of a walking or running person.

In the electronic device 1 according to the one embodiment, when the control unit 10 detects an object having a motion characteristic of a motion of an arm of a person, the control unit 10 may detect this object as a target. On the other hand, in the electronic device 1 according to the one embodiment, when the control unit 10 detects an object not having the above-described motion characteristic of the motion of the arm of the person, the control unit 10 may be configured not to detect this object as the target. In addition, in the electronic device 1 according to the one embodiment, when the control unit 10 detects no object having the above-described motion characteristic of the motion of the arm of the person, the control unit 10 may regard that no target is detected.

It is assumed that the person illustrated in FIG. 11 is walking or running at a velocity Vh from left to right in the drawing. As illustrated in FIG. 11, each arm of a walking or running person is usually in a motion similar to that of a pendulum hung from a fixed point O. In FIG. 11, a point at the right shoulder of the walking or running person corresponds to the fixed point O, and a point at the right hand of the walking or running person corresponds to the pendulum. From the viewpoint of the walking or running person, the fixed point O is substantially stationary (barely moves). On the other hand, from the viewpoint of the walking or running person, the pendulum is in such a motion (pendulum motion) that the pendulum draws an arc-like track in a substantially circumferential path with respect to the fixed point O at the center.

From the viewpoint of another person who is stationary, a motion of a point P in the arm of the person illustrated in FIG. 11 is observed as a combined motion of a motion of moving toward the right at the velocity Vh and the pendulum motion. Thus, in the electronic device 1 according to the one embodiment, when the control unit 10 determines that a certain point is in a pendulum motion while moving at the velocity Vh, the control unit 10 may detect an object including the point P as a target (walking or running person).

As described above, in the electronic device 1 according to the one embodiment, the control unit 10 performs control to detect, as a target, an object having a motion characteristic of a motion of an arm of a person, among objects located around the electronic device 1. In this case, the control unit 10 may perform control to detect, as the target, an object having a motion characteristic of a motion of a swinging arm of a walking or running person, among the objects located around the electronic device 1. In addition, the control unit 10 may perform control to detect, as the target, an object having a motion characteristic of a motion of an arm of a person who is moving at the predetermined velocity Vh, among the objects located around the electronic device 1.

In the above-described operation of the electronic device 1, the control unit 10 may perform control to detect, as the target, an object determined to have the motion characteristic of the motion of the arm of the person who is moving at the predetermined velocity Vh, among the objects located around the electronic device 1. In this case, the control unit 10 may determine whether an object located around the electronic device 1 has the motion characteristic of the motion of the arm of the person who is moving at the predetermined velocity Vh. If the object located around the electronic device 1 is determined to have the motion characteristic of the motion of the arm of the person who is moving at the predetermined velocity Vh, the control unit 10 may detect the object as the target.

Figure 12:
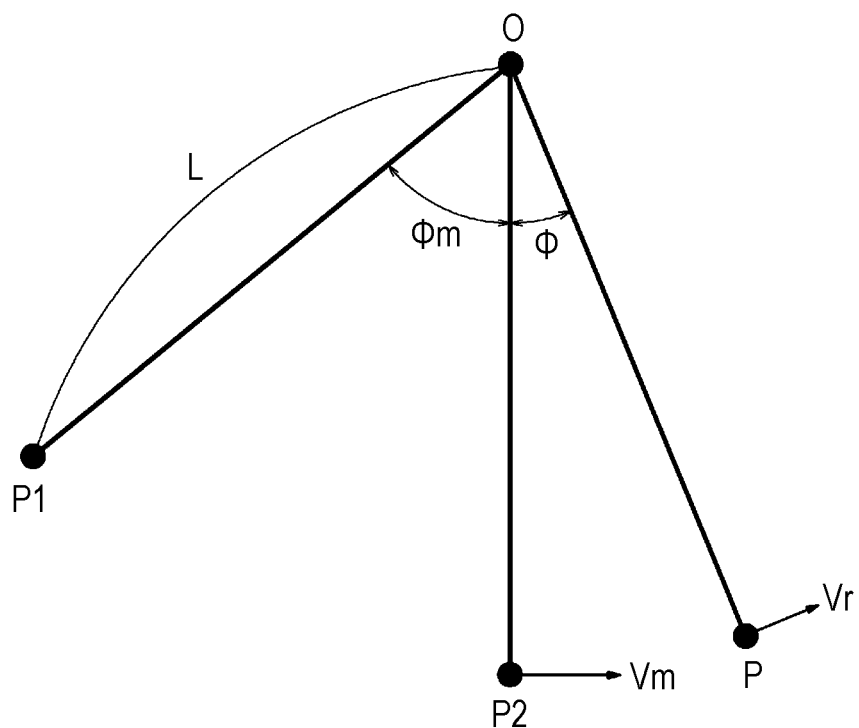
FIG. 12 is a diagram for describing the principle of how the electronic device according to the one embodiment detects a walking or running person.

FIG. 12 is a diagram for describing a pendulum motion that models the motion of the arm of the person illustrated in FIG. 11.

As illustrated in FIG. 12, it is assumed that a pendulum (having a mass M) is hung from the fixed point O at a distance of a length L. An angle of the pendulum with respect to a vertical direction at any position P of the pendulum is denoted by $\Phi$. In addition, a velocity of the pendulum at this time is denoted by Vr. In this case, a sum of potential energy and kinetic energy of the pendulum at the position P can be represented by Expression (1) below, where g denotes a gravitational acceleration.

$$MgL(1-\cos \Phi)+M(Vr)2/2 \qquad \text{Expression (1)}$$

A position P1 of the pendulum illustrated in FIG. 12 may be the highest point of the pendulum motion. At this time, the angle of the pendulum with respect to the vertical direction is denoted by $\Phi m$. In this case, the height of the pendulum motion in the vertical direction is the highest and the velocity Vr of the pendulum is equal to zero. That is, at the position P1, the potential energy of the pendulum becomes maximum and the kinetic energy of the pendulum becomes equal to zero. Accordingly, a sum of the potential energy and the kinetic energy of the pendulum at the position P1 can be represented by Expression (2) below.

$$MgL(1-\cos \Phi m) \qquad \text{Expression (2)}$$

A position P2 of the pendulum illustrated in FIG. 12 may be the lowest point of the pendulum motion. At this time, the angle $\Phi$ of the pendulum with respect to the vertical direction is equal to zero. In this case, the height of the pendulum motion in the vertical direction is equal to zero and the velocity Vr of the pendulum is the highest (Vm). That is, at the position P2, the potential energy of the pendulum becomes equal to zero and the kinetic energy of the pendulum becomes maximum. Accordingly, a sum of the potential energy and the kinetic energy of the pendulum at the position P2 can be represented by Expression (3) below.

$$M(Vm)2/2 \qquad \text{Expression (3)}$$

From Expressions (1) to (3) above, a velocity Vm at the position P2 which is the lowest point of the pendulum motion can be represented by Expression (4) below.

$$Vm=\{2gL(1-\cos \Phi m)\}1/2 \qquad \text{Expression (4)}$$

According to Expression (4) above, the velocity Vm at the position P2 which is the lowest point of the pendulum motion can be determined from the length (L) of the arm of the walking person and the maximum angle ($\Phi m$) of the arm swung by the person. Thus, for example, by storing data of L and $\Phi m$ for a typical person in the storage unit 40, the electronic device 1 can determine the velocity Vm. The storage unit 40 may store data of L and $\Phi m$ for some typical persons such as an adult and a child, an elderly person and a young person (or a toddler), and/or a male and a female, for example.

Figure 13:
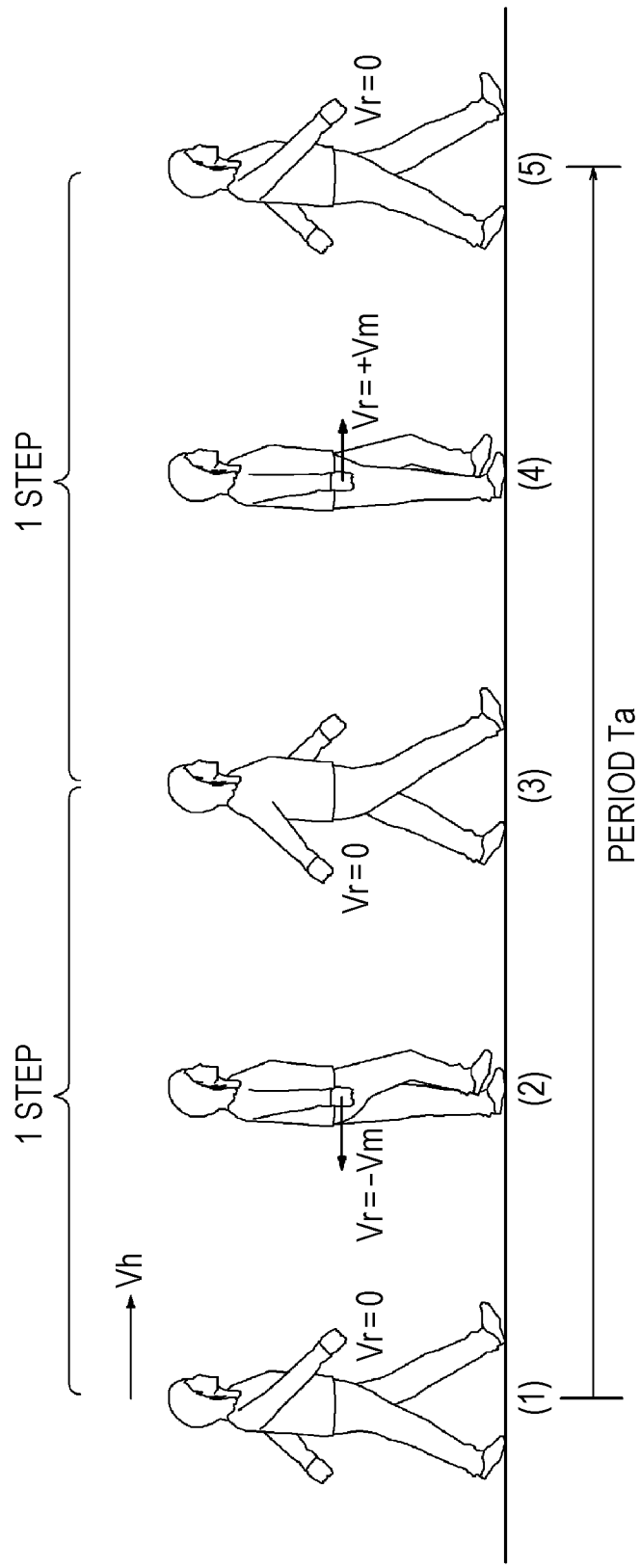
FIG. 13 is a diagram for describing the principle of how the electronic device according to the one embodiment detects a walking or running person.

FIG. 13 is a diagram illustrating the walking person illustrated in FIG. 11 at individual time points. FIG. 13 illustrates a body motion of the walking person sequentially from a time point (1) to a time point (5).

It is assumed that the person illustrated in FIG. 13 is walking at the velocity Vh from left to right in the drawing as in FIG. 11. In FIG. 13, a pendulum motion is focused on that models a motion of the right arm of the person illustrated in the drawing as in FIG. 11.

At the time point (1), the person's right hand that is in the pendulum motion reaches the highest point. Thus, the velocity Vr of the person's right hand becomes equal to zero. At the time point (2), the person's right hand that is in the pendulum motion reaches the lowest point. Thus, the velocity Vr of the person's right hand becomes maximum (−Vm) in a direction opposite to a traveling direction. At the time point (3), the person's right hand that is in the pendulum motion reaches the highest point again. Thus, the velocity Vr of the person's right hand becomes equal to zero. At the time point (4), the person's right hand that is in the pendulum motion reaches the lowest point again. Thus, the velocity Vr of the person's right hand becomes maximum (+Vm) in the same direction as the traveling direction.

At the time point (5), the person's right hand that is in the pendulum motion reaches the highest point again. Thus, the velocity Vr of the person's right hand becomes equal to zero. The time point (5) may indicate a state in which the motion has returned to that of the time point (1). Thus, the person illustrated in FIG. 13 may repeat the states from the time point (1) to the time point (4).

As illustrated in FIG. 13, a time from the time point (1) to the time point (5), that is, a time taken for the motion to return to the same state again, is referred to as a period Ta. The person illustrated in FIG. 13 walks two steps during the period Ta. Thus, the period Ta during which the arm of the person illustrated in FIG. 13 is in the pendulum motion can be represented by Expression (5) below, where W denotes a walking stride.

$$Ta=2W/Vh \qquad \text{Expression (5)}$$

According to Expression (5) above, the period Ta during which the arm of the walking person is in the pendulum motion can be determined from the walking stride (W) and the walking velocity (Vh). For example, by storing data of W and Vh for a typical person in the storage unit 40, the electronic device 1 can determine the period Ta. The storage unit 40 may store data of W and Vh for some typical persons such as an adult and a child, an elderly person and a young person (or a toddler), and/or a male and a female, for example. As an example, W and Vh may be set around W=0.7 [m] and around Vh=2.0 [m/s], respectively.

As illustrated in FIG. 13, when the walking person takes two steps during the period Ta, the number of times the velocity Vr of the person's right hand becomes equal to zero during the period Ta is twice (at the time points (1) and (3) in FIG. 13). That is, the velocity Vr of the pendulum motion of the arm of the person who is walking at the velocity Vh becomes equal to zero with respect to the walking velocity Vh twice during the period Ta. Thus, the control unit 10 may determine whether an object located around the electronic device 1 has a combined motion of a motion in which the object is moving at the velocity Vh and a motion in which the velocity Vr becomes equal to zero every half the period Ta. If the control unit 10 determines that the object has such a motion, the control unit 10 may determine that the object having the motion has a motion characteristic of a motion of an arm of a person. Note that the velocity Vr described above is a velocity from the viewpoint of movement at the velocity Vh. That is, the velocity Vr is a relative velocity with respect to the velocity Vh.

As described above, in the electronic device 1 according to the one embodiment, the control unit 10 may determine whether an object located around the electronic device 1 has a combined motion of a motion in which the object is moving at the velocity Vh and a motion in which the relative velocity Vr with respect to the velocity Vh of the object periodically becomes equal to zero. If the control unit 10 determines that the object has such a motion, the control unit 10 may determine that the object has the motion characteristic of the motion of the arm of the person who is moving at the velocity Vh.

In addition, as illustrated in FIG. 13, when the walking person takes two steps during the period Ta, each of the numbers of times the velocity Vr of the person's right hand becomes minimum and becomes maximum during the period Ta is once (at the time points (2) and (4) in FIG. 13). That is, the velocity Vr of the pendulum motion of the arm of the person who is walking at the velocity Vh becomes maximum (locally maximum) once and becomes minimum (locally minimum) once with respect to the walking velocity Vh during the period Ta. Thus, the control unit 10 may determine whether an object located around the electronic device 1 has a combined motion of a motion in which the object is moving at the velocity Vh and a motion in which the velocity Vr becomes locally maximum and locally minimum every half the period Ta. If the control unit 10 determines that the object has such a motion, the control unit 10 may determine that the object having the motion has the motion characteristic of the motion of the arm of the person. Note that the velocity Vr described above is a velocity from the viewpoint of movement at the velocity Vh. That is, the velocity Vr is a relative velocity with respect to the velocity Vh.

As described above, the control unit 10 may determine whether an object located around the electronic device 1 has a combined motion of a motion in which the object is moving at the velocity Vh and a motion in which the relative velocity Vr with respective to the velocity Vh of the object periodically and repeatedly becomes equal to a local maximum value (Vm) and a local minimum value (−Vm). If the control unit 10 determines that the object has such a motion, the control unit 10 may determine that the object has the motion characteristic of the motion of the arm of the person who is moving at the velocity Vh.

As described above, in the electronic device 1 according to the one embodiment, the control unit 10 may determine whether an object located around the electronic device 1 has a motion characteristic of a pendulum motion, having a predetermined period, in which the object is moving at the predetermined velocity Vh. When the control unit 10 determines that the object has the characteristic motion, the control unit 10 may determine that the object has the motion characteristic of the motion of the arm of the person who is moving at the predetermined velocity Vh.

In FIGS. 11 and 13, by focusing on the motion of the right arm or right hand of a walking person, it is determined whether a motion characteristic of the pendulum motion is included. However, in the electronic device 1 according to the one embodiment, the control unit 10 may determine whether the motion characteristic of the pendulum motion is included by focusing on a motion of the left arm or left hand of the walking person.

A person is apt to swing their arms in opposite directions while walking or running. Thus, in the electronic device 1 according to the one embodiment, when motions characteristic of pendulum motions in directions opposite to each other are detected in the vicinity of each other, the control unit 10 may detect objects having these motions as both arms of one person. In addition, when the motions characteristic of the pendulum motions in directions opposite to each other are detected in the vicinity of each other and an object is detected between the pendulum motions in the opposite directions, the control unit 10 may detect the object as a torso portion of one person.

In the embodiment described above, the control unit 10 determines whether an object located around the electronic device 1 has a combined motion of a motion in which the object is moving at the velocity Vh and a motion in which the relative velocity Vr with respect to the velocity Vh of the object periodically becomes equal to zero. The direction in which the object is moving, the angle of the direction from which the object is approaching, and/or the like may be corrected as appropriate to make it easier for the control unit 10 of the electronic device 1 to perform processing when the relative velocity Vr with respect to the velocity Vh is measured, detected, determined, or the like.

In addition, in the embodiment described above, the control unit 10 determines whether an object has a motion characteristic of a motion of a swinging arm of a walking person. However, in the electronic device 1 according to the one embodiment, the control unit 10 may determine whether an object has a motion characteristic of a motion of a swinging arm of a running person rather than a walking person. In this case, the velocity Vh illustrated in FIG. 13 may be faster at the time of running than at the time of walking. In addition, the person often keep their arms straight at the time of walking and often bends their arms at the time of running. Thus, the length L illustrated in FIG. 12 may be set shorter at the time of running than at the time of walking. In addition, the velocity Vm at the position P2 which is the lowest point illustrated in FIG. 12 may be faster at the time of running than at the time of walking. In addition, the stride W described above may be set longer at the time of running than at the time of walking. Further, the period Ta described above may be set shorter at the time of running than at the time of walking.

FIG. 14 is a flowchart for describing an operation of the electronic device 1 according to the one embodiment. The flow of the operation of the electronic device according to the one embodiment is described below.

The operation illustrated in FIG. 14 may be started, for example, when the electronic device 1 mounted in the mobility device 100 attempts to detect an object located around the mobility device 100.

In response to the start of the operation illustrated in FIG. 14, the control unit 10 determines the object detection range of each radar type (step S1). For example, in step S1, the control unit 10 may set the object detection range of the radar 1 illustrated in FIG. 8 to r1 (for example, from 0.2 m to 12.5 m) illustrated in FIG. 7. In addition, for example, in step S1, the control unit 10 may set the object detection range of the radar 2 illustrated in FIG. 8 to r2 (for example, from 1 m to 50 m) illustrated in FIG. 7. In addition, for example, in step S1, the control unit 10 may set the object detection range of the radar 3 illustrated in FIG. 8 to r3 (for example, from 5 m to 200 m) illustrated in FIG. 7. Such object detection ranges may be stored in advance in the storage unit 40. In step S1, the control unit 10 may determine the object detection ranges of the respective radars on the basis of an operation performed by a driver or the like of the mobility device 100, for example, or may determine the object detection ranges of the respective radars on the basis of an instruction from the control unit 10, the ECU 50, or the like, for example.

The operation in step S1 may be started again after the operation illustrated in FIG. 14 has been performed before, instead of the operation being performed for the first time after the start of the operation illustrated in FIG. 14. If the object detection ranges of the respective radars have already been determined by the control unit 10 when step S1 is performed again, the control unit 10 may use the determined object detection ranges again.

After the object detection ranges of the respective radars are determined in step S1, the control unit 10 sets various parameters in the electronic device 1 for each frame or the like of the transmission wave T in order to detect an object in the object detection ranges of the respective radars (step S2).

For example, in step S2, the control unit 10 may set various parameters for each frame or the like of the transmission wave T such that a range among the object detection ranges r1 to r3 illustrated in FIG. 7 is clipped as the object detection range to perform detection of an object. In step S2, for example, various parameters may be set for each frame of the transmission wave T, may be set for each portion (for example, for each subframe) constituting a frame (see FIG. 8 or 9), or may be set for each chirp signal (see FIG. 10). Various parameters set for clipping a detection range such as the object detection range of each radar and performing detection of an object may be stored in the storage unit 40, for example. In this case, in step S2, the control unit 10 may read the various parameters from the storage unit 40 and set the various parameters.

In step S2, the control unit 10 may set various parameters for each frame or the like of the transmission wave T such that the beam of the transmission wave is formed toward each of the determined object detection ranges. For example, in step S2, the control unit 10 may set various parameters for each frame or the like of the transmission wave T such that the beam of the transmission wave is directed toward the object detection range determined in step S1. The various parameters set for directing the beam of the transmission wave toward the detection range such as each object detection range can be stored in the storage unit 40, for example. In this case, in step S2, the control unit 10 may read the various parameters from the storage unit 40 and set the various parameters. In step S2, the control unit 10 may set the various parameters for each frame or the like of the transmission wave T, for example, in the phase control units 23 or the transmission unit 20.

As described above, in the electronic device 1 according to the one embodiment, the control unit 10 may set, for each frame or the like of the transmission wave T, parameters that define any of the plurality of object detection ranges based on the transmission signal and the reception signal. The control unit 10 may also switch the radar type for each frame or for each unit of processing in a frame from among the modes having different detection ranges and may notify the signal generating unit 21 of the radar type.

After the parameters are set in step S2, the control unit 10 performs control such that the transmission antenna 25 transmit the transmission wave T in accordance with an order of the frames or the like of the transmission wave T (step S3). For example, in step S3, the signal generating unit 21 may generate a transmission signal that functions as each type of radar, in accordance with an order of frames or the like of the transmission wave T on the basis of the parameters set by the control unit 10. In the case where beamforming of the transmission waves T is performed, in step S3, the phase control units 23 may perform control such that the transmission waves T transmitted from the plurality of transmission antennas 25 form a beam in a predetermined direction in accordance with the order of frames or the like of the transmission waves T. In this case, the phase control units 23 may control the phases of the respective transmission waves T. The phase control unit 23 may perform control so as to direct the beam of the transmission waves T toward the object detection range determined in step S1 in accordance with the order of frames or the like of the transmission waves T such that the beam covers at least part of the object detection range, for example.

After the transmission wave T is transmitted in step S3, the control unit 10 performs control to receive the reflected wave R from the reception antenna 31 (step S4).

After the reflected wave R is received in step S4, the control unit 10 performs control to determine whether an object located around the electronic device 1 has a motion characteristic of a motion of an arm of a person (step S5). In step S5, the control unit 10 may perform control to determine whether an object located around the electronic device 1 has the motion characteristic of the motion of the arm of the person who is moving at the predetermined velocity Vh, as described above. In step S5, the determination as to whether an object has the motion characteristic of the motion of the arm of the person may be made on the basis of the principle according to the embodiment described above.

If the control unit 10 determines that the object has the motion characteristic of the motion of the arm in step S5, the control unit 10 may detect the object as a target (step S6) and may end the operation illustrated in FIG. 14. In step S6, the control unit 10 may detect the presence of the object as the target on the basis of an estimation result obtained by at least any of the distance FFT processing unit 11, the velocity FFT processing unit 12, and the angle-of-arrival estimating unit 13. On the other hand, if the control unit 10 determines that the object does not has the motion characteristic of the motion of the arm in step S5, the control unit 10 may end the operation illustrated in FIG. 14. In addition, if no object having the motion characteristic of the motion of the arm is detected in step S5, the control unit 10 may end the operation illustrated in FIG. 14.

In step S6, the control unit 10 may perform, for example, object detection (for example, clustering) processing from angle information, velocity information, and distance information obtained for each of the plurality of different types of radars and may calculate average power of points constituting the object. In addition, in the electronic device 1 according to the one embodiment, the control unit 10 may notify an upper-level control CPU such as the ECU 50, for example, of object detection information or point cloud information obtained for each of the plurality of different types of radars.

Since detection of an object in step S6 can be performed on the basis of various algorithms or the like by using a known technology of a millimeter wave radar, more detailed description is omitted. After step S6 illustrated in FIG. 14, the control unit 10 may start the processing of step S1 again. In this case, the object detection ranges may be determined in step S1 on the basis of the result of object detection performed in step S6. As described above, in the electronic device 1 according to the one embodiment, the control unit 10 may detect an object that reflects the transmission wave T on the basis of the transmission signal transmitted as the transmission wave T and the reception signal received as the reflected wave R.

As described above, the electronic device 1 according to the one embodiment can detect a walking or running person as a target. The electronic device 1 according to the one embodiment does not detect a moving non-living thing or animal as a target but can detect a walking or running person as a target. That is, the electronic device 1 according to the one embodiment does not detect, as the target, a non-living thing or animal that is coincidentally moving at the same location and/or at the same velocity as that of a walking or running person. Thus, the electronic device 1 according to the one embodiment can implement a markedly beneficial application for detecting only a walking or running person and issuing a warning to a driver, for example.

While the present disclosure has been described on the basis of the various drawings and the embodiment, it should be noted that a person skilled in the art can easily make various variations or corrections on the basis of the present disclosure. Therefore, it should be noted that these variations or corrections are within the scope of the present disclosure. For example, functions and the like included in each functional unit can be rearranged without causing any logical contradiction. A plurality of functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure on the basis of the present disclosure. Accordingly, these variations and corrections are within the scope of the present disclosure. For example, in each embodiment, each functional unit, each means, each step, or the like can be added to another embodiment or replaced with each functional unit, each means, each step, or the like in another embodiment without causing any logical contradiction. In each embodiment, a plurality of functional units, means, steps, or the like may be combined into one or may be divided. In addition, the embodiments according to the present disclosure described above are not limited to strict implementation according to the respective embodiments described above, and may be implemented by appropriately combining the features or omitting part thereof.

The embodiments described above are not limited to implementation as the electronic device 1. For example, the embodiments described above may be implemented as a method for controlling a device such as the electronic device 1. For example, the embodiments described above may be implemented as a program executed by a device such as the electronic device 1.

The electronic device 1 according to one embodiment may include, as the minimum configuration, at least part of at least one of the sensor 5 and the control unit 10, for example. On the other hand, the electronic device 1 according to one embodiment may appropriately include at least any of the signal generating unit 21, the synthesizer 22, the phase control units 23, the amplifiers 24, and the transmission antennas 25 illustrated in FIG. 2 in addition to the control unit 10. The electronic device 1 according to the one embodiment may appropriately include at least any of the reception antennas 31, the LNAs 32, the mixers 33, the IF units 34, and the AD conversion units 35 instead of or along with the functional units described above. The electronic device 1 according to the one embodiment may include the storage unit 40. As described above, the electronic device 1 according to the one embodiment can employ various configurations. When the electronic device 1 according to the one embodiment is mounted in the mobility device 100, for example, at least any of the functional units described above may be installed at an appropriate place such as the inside of the mobility device 100. On the other hand, in one embodiment, for example, at least any of the transmission antennas 25 and the reception antennas 31 may be installed outside the mobility device 100.

REFERENCE SIGNS LIST 1 electronic device
5 sensor
10 control unit
11 distance FFT processing unit
12 distance detection determining unit 13 velocity FFT processing unit
14 velocity detection determining unit
15 angle-of-arrival estimating unit
16 object detecting unit
20 transmission unit
21 signal generating unit
22 synthesizer
23 phase control unit
24 amplifier
25 transmission antenna
30 reception unit
31 reception antenna
32 LNA
33 mixer
34 IF unit
35 AD conversion unit
40 storage unit
50 ECU
100 mobility device
200 object

The invention claimed is:

1. An electronic device comprising:
a transmission antenna that transmits a transmission wave;
a reception antenna that receives a reflected wave that is the transmission wave having been reflected; and
a control unit that detects an object that reflects the transmission wave, based on a transmission signal transmitted as the transmission wave and a reception signal received as the reflected wave, wherein
the control unit performs control to detect, as a target, an object having a motion characteristic of a motion of an arm of a person, among objects located around the electronic device; and
wherein
in a case where Vh denotes a walking velocity of the person, g denotes a gravitational acceleration, L denotes a length of the arm of the person, and Om denotes a maximum angle of the arm swung by the person, when a relative velocity Vr obtained by subtracting the velocity Vh from a measured velocity of an object satisfies $Vr=\{2gL(1-\cos \Phi m)\}1/2$, the control unit determines that the object has a motion characteristic of a motion of an arm of a person who is moving at a predetermined velocity, or
in a case where Vh denotes a walking velocity of the person and W denotes a walking stride of the person, when a measured period Ta of an object satisfies $Ta=2 W/Vh$, the control unit determines that the object has a motion characteristic of a motion of an arm of a person who is moving at a predetermined velocity.

2. The electronic device according to claim 1, wherein the control unit performs control to detect, as the target, an object having a motion characteristic of a motion of an arm of a person who is moving at a predetermined velocity, among the objects located around the electronic device.

3. The electronic device according to claim 1, wherein the control unit performs control to detect, as the target, an object having a motion characteristic of a motion of a swinging arm of a walking or running person, among the objects located around the electronic device.

4. The electronic device according to claim 2, wherein the control unit performs control to detect, as the target, an object determined to have the motion characteristic of the motion of the arm of the person who is moving at the predetermined velocity, among the objects located around the electronic device.

5. The electronic device according to claim 4, wherein the control unit performs control: to determine whether an object located around the electronic device has the motion characteristic of the motion of the arm of the person who is moving at the predetermined velocity; and to detect the object as the target when the object is determined to have the motion characteristic of the motion of the arm of the person who is moving at the predetermined velocity.

6. The electronic device according to claim 4, wherein the control unit determines that an object located around the electronic device has the motion characteristic of the motion of the arm of the person who is moving at the predetermined velocity when the object has a motion characteristic of a pendulum motion having a predetermined period, the pendulum motion being a motion in which the object is moving at the predetermined velocity.

7. The electronic device according to claim 4, wherein the control unit determines that an object located around the electronic device has the motion characteristic of the motion of the arm of the person who is moving at the predetermined velocity when the object has a combined motion of a motion in which the object is moving at a predetermined velocity Vh and a motion in which a relative velocity Vr with respect to the predetermined velocity Vh of the object periodically becomes equal to zero.

8. The electronic device according to claim 4, wherein the control unit determines that an object located around the electronic device has the motion characteristic of the motion of the arm of the person who is moving at the predetermined velocity when the object has a combined motion of a motion in which the object is moving at a predetermined velocity Vh and a motion in which a relative velocity Vr with respect to the predetermined velocity Vh of the object periodically and repeatedly becomes equal to a local maximum value Vm and a local minimum value−Vm.

9. A method for controlling an electronic device, comprising:
a step of transmitting a transmission wave from a transmission antenna;
a step of receiving, from a reception antenna, a reflected wave that is the transmission wave having been reflected; and
a step of detecting an object that reflects the transmission wave, based on a transmission signal transmitted as the transmission wave and a reception signal received as the reflected wave, wherein
in the step of detecting, among objects located around the electronic device, an object having a motion characteristic of a motion of an arm of a person is detected as a target; and
wherein
in a case where Vh denotes a walking velocity of the person, g denotes a gravitational acceleration, L denotes a length of the arm of the person, and Om denotes a maximum angle of the arm swung by the person, when a relative velocity Vr obtained by subtracting the velocity Vh from a measured velocity of an object satisfies $Vr=\{2gL(1-\cos \Phi m)\}1/2.$ determining that the object has a motion characteristic of a motion of an arm of a person who is moving at a predetermined velocity, or in a case where Vh denotes a walking velocity of the person and W denotes a walking stride of the person, when a measured period Ta of an object satisfies $$Ta = 2\ W/Vh.$$

determining that the object has a motion characteristic of a motion of an arm of a person who is moving at a predetermined velocity.

10. A non-transitory computer-readable recording medium storing computer program instructions, which when executed by an electronic device, cause the electronic device to:
- transmit a transmission wave from a transmission antenna;
- receive, from a reception antenna, a reflected wave that is the transmission wave having been reflected; and
- detect an object that reflects the transmission wave, based on a transmission signal transmitted as the transmission wave and a reception signal received as the reflected wave, wherein,
- among objects located around the electronic device, an object having a motion characteristic of a motion of an arm of a person is detected as a target; and wherein
in a case where Vh denotes a walking velocity of the person, g denotes a gravitational acceleration, L denotes a length of the arm of the person, and Φm denotes a maximum angle of the arm swung by the person, when a relative velocity Vr obtained by subtracting the velocity Vh from a measured velocity of an object satisfies $$Vr = \{2gL(1-\cos \Phi m)\}1/2,$$

determine that the object has a motion characteristic of a motion of an arm of a person who is moving at a predetermined velocity, or in a case where Vh denotes a walking velocity of the person and W denotes a walking stride of the person, when a measured period Ta of an object satisfies $$Ta = 2\ W/Vh,$$

determine that the object has a motion characteristic of a motion of an arm of a person who is moving at a predetermined velocity.

* * * * *